(12) United States Patent
Matsufuji

(10) Patent No.: US 6,314,827 B1
(45) Date of Patent: Nov. 13, 2001

(54) TRANSMISSION FOR A WORKING VEHICLE

(75) Inventor: Mizuya Matsufuji, Amagasaki (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 0 days.

(21) Appl. No.: 09/617,775

(22) Filed: Jul. 17, 2000

Related U.S. Application Data

(62) Division of application No. 09/145,021, filed on Sep. 1, 1998, now Pat. No. 6,119,552.

(30) Foreign Application Priority Data

| Sep. 1, 1997 | (JP) | 9-236293 |
| Sep. 1, 1997 | (JP) | 9-236294 |
| Sep. 1, 1997 | (JP) | 9-236295 |
| Sep. 18, 1997 | (JP) | 9-253527 |

(51) Int. Cl.[7] .............. F16H 3/08; F16H 37/00
(52) U.S. Cl. .............. 74/325; 74/15.86
(58) Field of Search .............. 74/606 R, 325, 74/330, 331, 15.63, 15.66, 15.84, 15.86

(56) References Cited

U.S. PATENT DOCUMENTS

| 2,975,656 | * | 3/1961 | Haverlender | 74/15.86 X |
| 3,922,931 | | 12/1975 | Osujyo et al. | |
| 4,208,923 | | 6/1980 | Ikegami. | |

(List continued on next page.)

FOREIGN PATENT DOCUMENTS

| 2343743 | * | 3/1975 | (DE) | 74/15.86 |
| 889447 | | 3/1999 | (EP). | |
| 5-26686 | | 4/1993 | (JP). | |
| 6-3213 | | 1/1994 | (JP). | |
| 7-117507 | | 5/1995 | (JP). | |
| 11-82642 | | 3/1999 | (JP). | |

OTHER PUBLICATIONS

Patent Abstracts of Japan, Abstract for JP363011421A, Jan. 18, 1988 & JP 5–26686 B2, Jan. 1988.

*Primary Examiner*—Charles A. Marmor
*Assistant Examiner*—Roger Pang
(74) *Attorney, Agent, or Firm*—Sterne, Kessler, Goldstein & Fox P.L.L.C.

(57) ABSTRACT

A transmission for a working vehicle like a tractor of the invention is housed in a transmission housing 1 interposed between an engine and a rear axle housing 2. An interior of transmission housing 1 is divided into a front chamber A and a rear chamber B through a partition wall 1a. In front chamber A is disposed a main-clutch system partition centering a traveling-input shaft 7. In rear chamber B is disposed a speed-changing system as a combination of reversing arrangement and multi-speed-changing arrangement. In a rear-opening of housing 1 is disposed a bearing plate 3. In rear chamber B, a first speed-changing shaft 8, a second speed-changing shaft 9 and a front transmission output shaft 10 are supported in parallel between wall 1a and plate 3. A regular speed-reduction gear train and a reversing speed-reduction gear train are interposed ed between shafts 8 and 9, so that shafts 8 and 9 can be connected with each other through one of the gear trains by a first clutch device C1 on shaft 8. A second clutch device C2 is on shaft 9 so as to selectively connect shafts 7 and 9 directly. A plurality of gear trains for multi-speed stages are interposed between shafts 9 and 10, so that shafts 9 and 10 are connected with each other through one of the gear trans by a third clutch device C3 on shaft 10. A cover 51 is settled on housing 1. A main (second) speed-changing lever 52 and a sub (first) speed-changing lever 52 are disposed respectively at both lateral sides of cover 51. Third clutch device C3 is operated by lever 52. First and second clutch devices C1 and C2 are selectively operated by lever 55.

19 Claims, 20 Drawing Sheets

U.S. PATENT DOCUMENTS

| | | |
|---|---|---|
| 4,273,001 | 6/1981 | Miyahara et al. . |
| 4,462,273 | 7/1984 | Yoshii et al. . |
| 4,528,867 | 7/1985 | Semba et al. . |
| 4,571,786 | 2/1986 | Osujo . |
| 4,580,459 * | 4/1986 | Zenker et al. ............... 74/359 |
| 4,677,866 | 7/1987 | Tone . |
| 4,716,775 | 1/1988 | Horii et al. . |
| 4,738,149 * | 4/1988 | Janiszewski ............... 74/331 X |
| 4,741,227 | 5/1988 | Yamada et al. . |
| 4,750,580 * | 6/1988 | Umemoto ............... 74/15.63 X |
| 4,794,807 * | 1/1989 | Horii et al. ............... 74/45.66 X |
| 4,856,611 | 8/1989 | Teraoka et al. . |
| 4,881,417 | 11/1989 | Yoshii et al. . |
| 5,058,455 | 10/1991 | Nemoto et al. . |
| 5,058,459 | 10/1991 | Nemoto et al. . |
| 5,178,039 * | 1/1993 | Shirley et al. ............... 74/606 R |
| 5,429,005 * | 7/1995 | Fukui et al. ............... 74/325 |
| 5,613,401 * | 3/1997 | Maurizio ............... 74/325 |
| 5,947,218 * | 9/1999 | Ishimaru ............... 74/15.86 X |
| 6,003,391 | 12/1999 | Kojima et al. . |

* cited by examiner

TRANSMISSION FOR A WORKING VEHICLE

CROSS-REFERENCE TO RELATED APPLICATION

This application is a divisional of U.S. application Ser. No. 09/145,021, filed Sep. 1, 1998 (allowed) now U.S. Pat. No. 6,119,552.

BACKGROUND OF THE INVENTION

1. Field of the Invention

The present invention relates to a construction of a transmission adapted to a working vehicle like a tractor for transmitting power from an engine of the vehicle into a differential unit for rear wheels thereof, particularly, of a type having a traveling-input shaft drivingly connected with the engine and a traveling-output shaft drivingly connected with the differential unit, which are disposed in parallel to each other, and it relates to a construction of a housing for the transmission. Additionally, it relates to various systems in connection with the transmission, particularly, a speed-changing operation system (occasionally having a creeping speed range), which includes a supporting mechanism of a lever for speed-changing and a connecting and disconnecting mechanism of the speed-changing operation system to the transmission.

2. Related Art

A transmission of a working vehicle like a tractor includes a series of a main-clutch system and a speed-changing system between an output area of an engine mounted on a front portion of the vehicle and a differential unit for rear wheels housed in a rear axle housing supporting rear axles. Conventionally, the main-clutch system is housed in a clutch housing as a front parted housing continuously connected to the output portion of the engine, and the speed-changing system is housed in an exclusive transmission casing as a middle parted housing interposed between the front parted housing and the rear axle housing as a rear parted housing. The transmission casing is fastened at its front and rear ends to both of the housings by bolts. The main-clutch system and the speed-changing system are connected with each other according to fastening the clutch housing and the transmission casing.

Also, the conventional speed-changing system housed in the transmission casing has reversing arrangement and tandem speed-changing arrangements distributively disposed on a shaft as described in Japanese Patent No. Hei 5-26686.

Also, the conventional transmission casing has respective supporting portions for a plurality of speed-changing levers as described in Japanese Utility Model No. Hei 6-3213.

Japanese Patent Nos. Hei 5-26686 and Hei 7-117507 describe a front-wheel driving PTO (power-take off) system for transmitting power from the speed-changing system in the transmission casing to the front wheels. Particularly, the former describes a front-wheel driving PTO unit outwardly projecting from the transmission casing. A transmission shaft connecting the unit and the speed-changing system is disposed outside the transmission casing.

It is desirable to reduce the manufacturing cost of the transmission and to simplify its assembly and maintenance. However, the conventional housing for the transmission consists of the above-mentioned three parted housings fastened together by bolts, thereby requiring two processes of positioning and bolting to fasten them. Thus, it is complicated and expensive to assemble the housing.

It is conceivable for a single housing member to replace the front and middle parted housings. In this way, only a process of fastening the single housing member and the rear axle housing is required to manufacture a housing for the transmission. However, the main-clutch system and the speed-changing system must be housed in the housing member, wherein each of the systems requires to be settled easily and supported steadily.

Referring to the conventional speed-changing lever, the supporting portions for the lever are formed integrally with the transmission casing, thereby complicating manufacture of the transmission casing and increasing its price, especially when a plurality of supporting portions are formed in correspondence to a plurality of levers.

Referring to the conventional front-wheel driving PTO system, the unit therefor is partly housed in the transmission casing so as to be disposed at a longitudinally intermediate space of the speed-changing system or at a rear space, whereby the distance between the unit and the front-wheel driving unit disposed between left and right front wheels is long. Thus, the transmission shaft between both of the units must be long, thereby causing a high manufacturing cost and lowering the efficiency of front-wheel driving. Therefore it is desirable for the front-wheel driving PTO unit to be near the front-wheel driving unit.

The transmission shown in Japanese Patent No. Hei 5-26686 is constructed between a traveling-input shaft drivingly connected with an engine of a working vehicle like a tractor and a traveling-output shaft drivingly connected with rear wheels. The two shafts are disposed in parallel to each other. It is a combination of previous first speed-changing arrangement which can appear three ranges of high-speed advancing, low-speed advancing and reversing and subsequent second speed-changing arrangement which can appear multi-speed stages in every range of first speed-changing arrangement. The first and second speed-changing arrangement are disposed in front and rear of a vehicle body, thereby causing the transmission as a whole to be longitudinally long. If a clutch device for creeping-speed range is additionally provided, the length is increased even further.

If the first and second speed-changing arrangement are disposed in parallel or overlap in a longitudinal direction, the transmission can be longitudinally shortened, thereby compacting the vehicle. Also, the front-wheel driving PTO unit can be disposed further forward so as to approach the front-wheel driving unit, thereby improving efficiency of front-wheel driving.

Referring to shift patterns of the speed-changing levers described in Japanese Patent No. Hei 5-26686, a lever for operating the first speed-changing arrangement is shifted along a straight slot, and a lever for operating the second speed-changing arrangement is shifted along an H-like shaped slot. However, the second speed-changing arrangement for multi-speed-changing is used rather frequently when traveling, thereby requiring it to be operable more simply.

SUMMARY OF THE INVENTION

The transmission for a working vehicle in accordance with the present invention is provided with an integral transmission housing for containing a main-clutch system and a speed-changing system interposed between an engine and a rear axle housing containing a rear-wheel differential unit for the purpose of simplifying an assembly of its housing. The assembly and -disassembly of the housing can be completed in a single process of joining and disjoining the transmission housing and the rear axle housing though bolts.

An object of the present invention is to provide a transmission including the transmission housing, whose main-clutch system and speed-changing system are disposed in the transmission housing so as to be compact (particularly, longitudinally short) and convenient to maintain, and whose means having relations with the speed-changing system, e.g., front-wheel driving PTO unit, speed-changing operating means and PTO shaft are disposed so as to be compact, convenient to maintain and nicely operable.

To achieve this object, the transmission housing is provided at its front and rear ends with openings respectively and at its interior with a partition wall so as to be divided before and behind into a front chamber and a rear chamber respectively. The main-clutch system continuously combined with an output area of an engine is inserted into the front chamber through the front end opening of the transmission housing to be settled therein. The speed-changing system drivingly following the main-clutch system is inserted into the rear chamber through the rear end opening of the transmission housing to be settled therein. A bearing plate is fixed on either the transmission housing or the rear axle housing so as to be disposed in vicinity of the rear end opening of the transmission housing and the front end opening of the rear axle housing, whereby the speed-changing system is supported between the partition wall and the bearing plate in the rear chamber.

Accordingly, the main-clutch system and the speed-changing system can be removably settled easily in the transmission housing before and behind one with the partition wall by manner of their insertion through the front and rear end openings. Also, the interiors of the transmission housing and the rear axle housing can be divided by the simple bearing plate. The bearing plate can be easily disposed by being fastened to either housing. The settled bearing plate can support the rear end of the speed-changing system in the rear chamber, and can also support the front ends of the traveling-output system and the rear-PTO-output system in the rear axle housing. Thus, the invention can provide a transmission for a working vehicle whose inner systems and housing can be assembled and disassembled easily.

Preferably, the bearing plate is provided with a lubricating oil dividing port for leading the oil in the transmission housing to lubricated areas of the speed-changing system.

In this lubricating construction, the lubricated areas of the speed-changing system can be supplied with sufficient lubricating oil, thereby improving the efficiency and durability of the speed-changing system.

The speed-changing system in the rear chamber is a transmission constructed between a traveling-input shaft provided thereon with the main-clutch system so as to be longitudinally supported in the front chamber and a traveling-output shaft disposed in parallel to the traveling-input shaft so as to be drivingly connected with the rear axles. It comprises three parallel shafts (i.e., a first speed-changing shaft, a second speed-changing shaft and a traveling-output shaft) provided thereon with a reversing arrangement and a multi-speed-changing arrangement. The first speed-changing shaft, which always drivingly follows the traveling-input shaft, is disposed in parallel to the traveling-output shaft. The second speed-changing shaft in parallel to the first speed-changing shaft is disposed co-axially with the traveling-input shaft so as to face the traveling-input shaft.

Since the reversing arrangement and the multi-speed-changing arrangement constituting the speed-changing system, which have been conventionally separately disposed before and behind, overlap longitudinally by their disposal on the parallel shafts between the partition wall and the bearing plate, the transmission as a whole can be longitudinally short, so as to be advantageous in making the vehicle more compact and in disposing a below discussed front-wheel driving PTO unit forward so as to approach the front-wheel driving unit.

Thus, the three shafts of the transmission can be compactly contained in the rear chamber so that the gears on the shafts may effectively engage with one another.

The traveling-input shaft is disposed at substantially lateral center in the transmission housing. The first and second speed-changing shafts are disposed respectively at both lateral sides of the traveling-input shaft.

The traveling-output shaft is provided thereon with a front-wheel driving PTO gear drivingly connected to front wheels and is disposed below the first speed-changing shaft, whereby the front-wheel driving PTO gear approaches a front-wheel driving PTO (discussed below) unit so as to compact the unit.

A front-wheel driving PTO unit is attached to a bottom of the transmission housing facing the rear chamber. A front-wheel driving PTO gear for transmitting power taken from the speed-changing system to the unit is rotatably supported by the bearing plate in the rear chamber.

Since the front-wheel driving PTO gear is disposed close to the partition wall as a front wall of the rear chamber, the distance between the front-wheel driving PTO unit and a front-wheel driving unit between left and right front wheels can be short, thereby reducing the manufacturing cost of a universal joint interposed therebetween and improving the efficiency of the front-wheel driving unit.

The traveling-input shaft and the second speed-changing shaft are made to be cylindrical. A rear-PTO transmission shaft is disposed to pass through both of the cylindrical shafts.

Accordingly, the rear-PTO transmission shaft can be disposed together with the traveling transmission in the same space, thereby compacting the entire transmission.

For the reversing arrangement; a first drive gear and a second drive gear are rotatably provided on the first speed-changing shaft. The first drive gear decelerates the second speed-changing shaft in regular directed rotation. The second drive gear always engages with an idling gear rotatably provided on the traveling-output shaft for reversely rotating the second speed-changing shaft. A first clutch device is provided for selectively connecting the first speed-changing shaft to either the first or second drive gear. A second clutch device is interposed between the traveling-input shaft and the second speed-changing shaft so as to directly connect both the shafts only when both of the first and second drive gears are disconnected.

For the multi-speed-changing arrangement, a plurality of drive gears are fixedly provided on the second speed-changing shaft. A plurality of driven gears are on the traveling-output shaft relatively rotatably provided which respectively engage with the drive gears on the second speed-changing shaft. A third clutch device is provided for selectively connecting one of the driven gears with the traveling-output shaft.

Thus, the reversing switching arrangement and the multi-speed-changing arrangement are compactly structured. The gear trains and the clutch devices of the pair of arrangements overlap longitudinally, thereby longitudinally shortening the transmission. Double power transmitting between the first and second speed-changing shafts can be avoided because the second clutch device connects the traveling-input shaft and the second speed-changing shaft only when the first clutch device is neutral.

With regard to the reversing arrangement, the first drive gear always engages with one of drive gears on the second speed-changing shaft and the idling gear, which engages with the second drive gear, also always engages with another of the drive gears on the same shaft.

Thus, the drive gears for multi-speed-changing are also used for the advancing-gear train and the reversing-gear train, thereby reducing the number of gears.

At least one of the first, second and third clutch devices is provided with a synchronizer.

In this construction, the clutch device can be smoothly operable, thereby easing the operation thereof and reducing shock in connecting and disconnecting thereof.

The first and second clutch devices are selectively operable by a longitudinally and laterally rotatable first (sub) speed-changing lever, thereby reducing the number of parts therefor and easing advancing-and-reversing switching operation.

The third clutch device is operable by a second (main) speed-changing lever longitudinally movable along a straight shift pattern so as to provide multi-speed stages through the multi-speed-changing arrangement, thereby easing multi-speed-changing operation in comparison with the conventional multi-speed-changing lever which has been complicated in operation along a shift pattern having various directions.

The first and second speed-changing levers are respectively supported to both lateral sides of a cover enclosing an opening bored through an outer wall of the housing toward the rear chamber therein.

Accordingly, each of the first and second speed-changing lever, which has been conventionally supported by a housing directly, can be easily connected and disconnected to the speed-changing system in the rear chamber simply by attaching and detaching the cover integrally supporting the levers to the transmission housing. When supporting a plurality of levers (which are provided respectively for the above mentioned pair of arrangements of the speed-changing system), the conventional speed-changing lever supporting construction has been more complicated, however, the first and second speed-changing levers supported by the cover in accordance with the invention can be connected and disconnected to respective arrangements of speed-changing system in the transmission housing easily. Moreover, the levers can be separately disposed easily on both sides of a seat. The transmission housing can be simply formed so as to be manufactured at a low price because it is separated from the cover supporting the levers.

Clutch fork shafts for the speed-changing system are axially slidably supported between the partition wall and the bearing plate in the corner spaces of the rear chamber facing the interior of the cover through the opening of the transmission housing, whereby they can be easily and simply disposed in the transmission housing so as to be connected and disconnected to respective speed-changing levers easily.

Connecting members for connecting the speed-changing levers and the clutch fork shafts are detachably attached to respective upper surfaces of the clutch fork shafts through the opening enclosed by the cover. Thus, the connecting members of the clutch fork shafts can be assembled and disassembled easily.

Each of the connecting members is provided with a neutral returning member for biasing an operating shaft of a basic end of the speed-changing lever toward its neutral position.

Accordingly, the speed-changing lever is naturally fixedly located at the neutral position when an operator releases his hand from it. The speed-changing lever is provided from waste rotation against force applied thereon.

Moreover, referring to the transmission additionally provided with a creeping speed range, between the first and second speed-changing shafts are interposed three gear trains (i.e., a regular speed-reduction gear train, a reversing gear train and a creeping speed-reduction gear train). Between the second speed-changing shaft and the traveling-output shaft are interposed a plurality of speed-reduction gear trains for multi-speed. A first clutch device is provided on the first speed-changing shaft. It selectively engages with either the regular speed-reduction gear train or the reversing gear train so as to transmit power between the first and second speed-changing shafts through the selected gear train. A second clutch device is provided on the second speed-changing shaft. It selectively connects the traveling-input shaft with the second speed-changing shaft directly or engages with the creeping speed-reduction gear train so as to transmit power between the first and second speed-changing shafts only when the regular speed-reduction gear and the reversing gear are disconnected. A third clutch device is provided on the traveling-output shaft so as to selectively connect one of the speed-reduction gear trains between the second speed-changing shaft and the traveling-output shaft.

In this construction, the gear trains, to which one for creeping-speed range is added, are disposed so as to overlap longitudinally and the first, second and third clutch devices can be laterally divided, thereby compacting and longitudinally shortening the transmission as a whole.

The first and second clutch devices are selectively operated by a lever, i.e., the first speed-changing lever which is movable to both opposite directions from the neutral position.

Thus, the first and second clutch devices can be selectively operated by a single speed-changing lever (the first speed-changing lever) so as to appear a reversing range, a low-speed advancing range, a creeping-speed advancing range and a high-speed advancing range, thereby easing operation of advancing-and-reversing switching operation and reducing the number of parts therefor.

The creeping speed-reduction gear train consists of a drive gear fixed on the first speed-changing shaft, a driven gear relatively rotatably provided on the second speed-changing shaft and a group of gears connecting the drive and driven gears. The group of gears are supported by a lid which is detachably attached to the transmission housing.

Thus, a creeping speed-reduction gear train constructed in such a manner can be easily attached to the transmission of a vehicle requiring a creeping-speed range.

Other and further objects, features and advantages of the present invention will appear more fully from the following description.

DETAILED DESCRIPTION OF THE PREFERRED EMBODIMENTS

With the above mentioned and other objects in view, the present invention consists in the methods and the construction hereinafter fully described, illustrated in the accompanying drawings, and set forth in the claims hereto appended, it being understood that various changes in the operation, form, proportion and minor details of construction, within the scope of the claims, may be resorted to without departing from the spirit of the present invention or sacrificing any of the advantages thereof.

Figure 11:
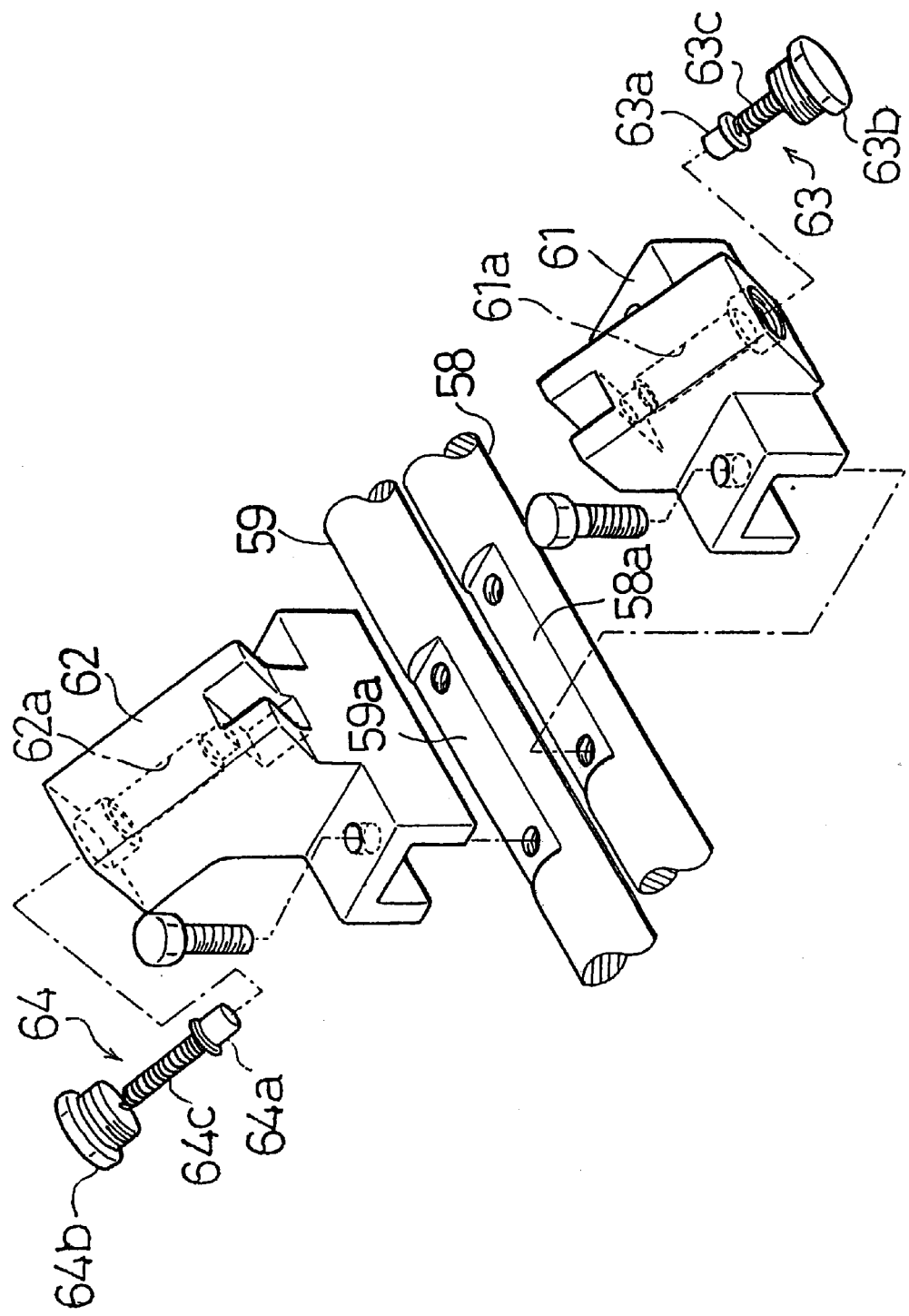
FIG. 11 is an exploded perspective view of connecting members 61 and 62 and clutch shafts 58 and 59.

At first, explanation will be generally given to a tractor as an embodiment of a working vehicle employing a transmission of the present invention. An engine E is disposed on a front frame 83 in front of the tractor. Frame 83 and engine E are covered with a bonnet 84. In bonnet 84, a radiator 85 is disposed before engine E and a muffler 86 is disposed above engine E. An exhaust pipe 87 extends from muffler 86 so as to project outside bonnet 84. A rear end of bonnet 84 is close to a dashboard 88 provided with a steering wheel 89. Behind dashboard 88 are disposed left and right fenders 90 covering left and right rear wheels 78. Between fenders 90, a seat 91 is disposed and a main (second) speed-change lever 52 and a sub (first) speed-change lever 55 are disposed respectively on both sides of seat 91 as shown in FIG. 11.

A transmission housing 1 is fastened at its front end to an output portion provided on the rear end of engine E by bolts and is extended rearward so as to pass through below seat 91 and to be fastened at its rear end to a front end of a rear axle housing 2 disposed between left and right rear wheels 78 by bolts, thereby forming a combination transmission housing and vehicle body frame. Housing 1 consists of a front housing half 1F and a rear housing half 1R fastened to each other by bolts.

In housing 2 are contained a rear-wheel differential drive system and a rear-PTO system. Rear axles 77 are journalled by left and right side portions of housing 2 and rear wheels 78 are respectively attached to outer ends of rear axles 77. On housing 2 is mounted a hydraulic lifting device 92 having lift arms 93 for moving a working machine attached to the rear of the tractor up and down. A PTO shaft 18 projects rearward from a cover 17 attached to the rear surface of housing 2 for transmitting power of engine E into the working machine.

Furthermore, a front-axle housing 80 for housing a front-wheel differential drive system and journalling left and right front axles 81 is disposed under frame 83. Left and right front wheels 82 are attached to outer ends of front axles 81. A front-wheel driving PTO casing 4 is attached to the bottom of housing 1. A front-wheel driving PTO shaft 20 is extended forward from casing 4 and is connected to the front differential drive system in housing 80 through a joint shaft 79. Thus, power is transmitted from a speed-changing system in housing 1 into front wheels 82 on front axles 81.

Figure 1:
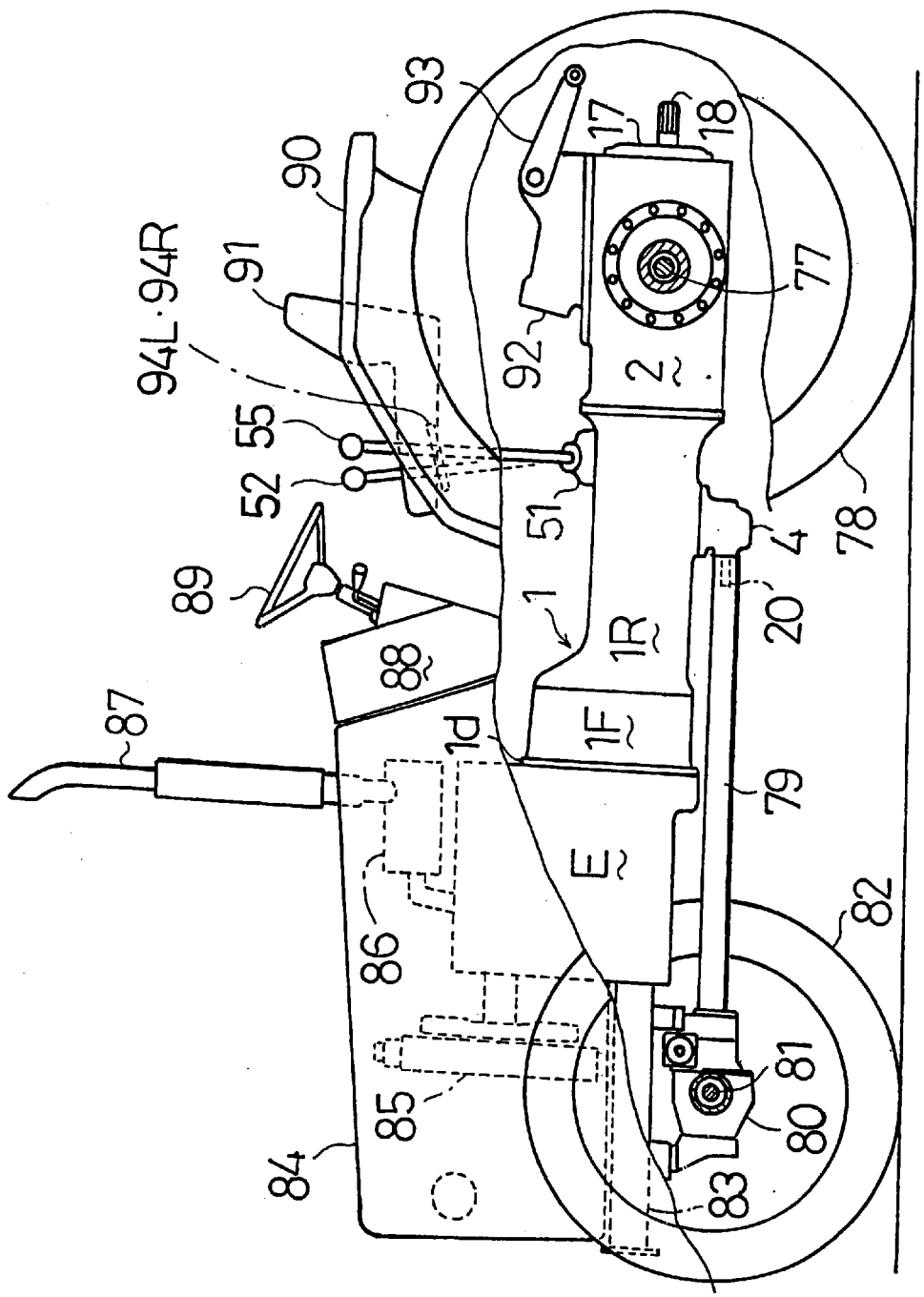
FIG. 1 is a whole side view of a tractor provided with a transmission in accordance with a first embodiment of the present invention.
Figure 2:
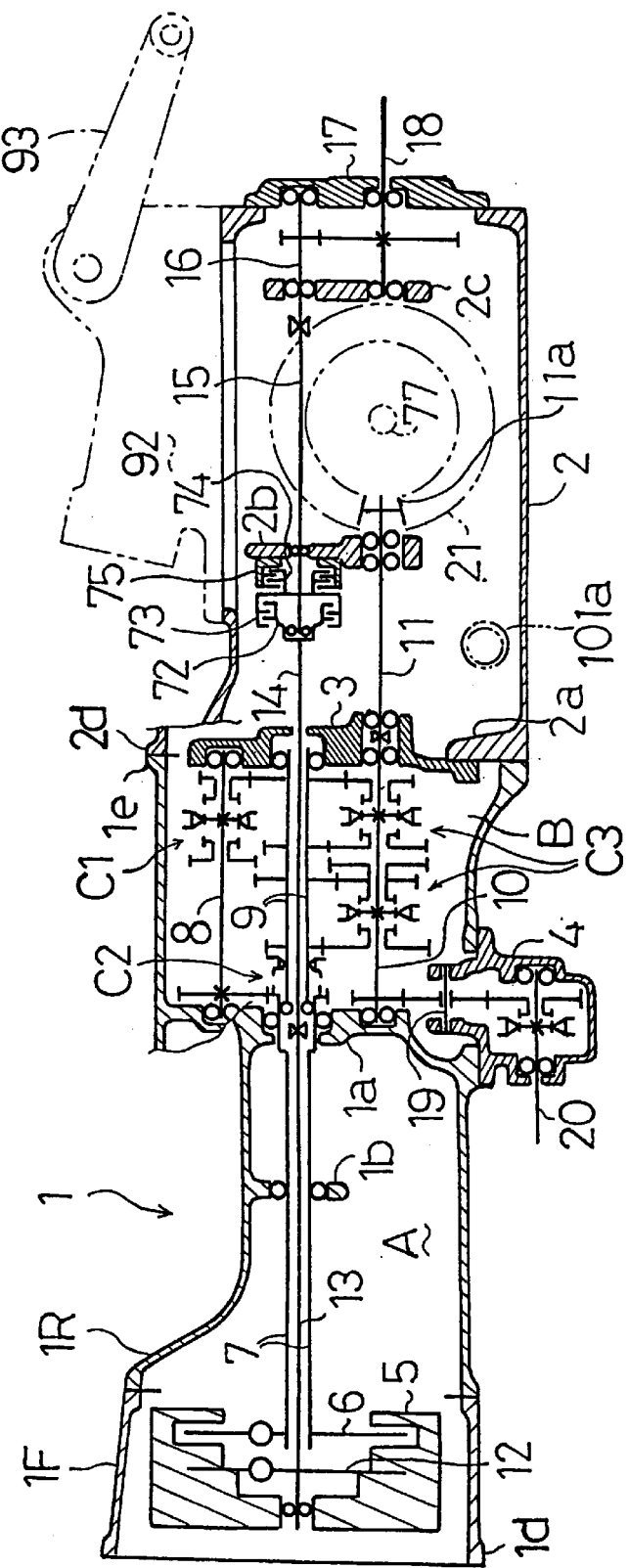
FIG. 2 is a schematic sectional side view of housings for the transmission and a diagram of the transmitting system therein in accordance with the first embodiment.
Figure 3:
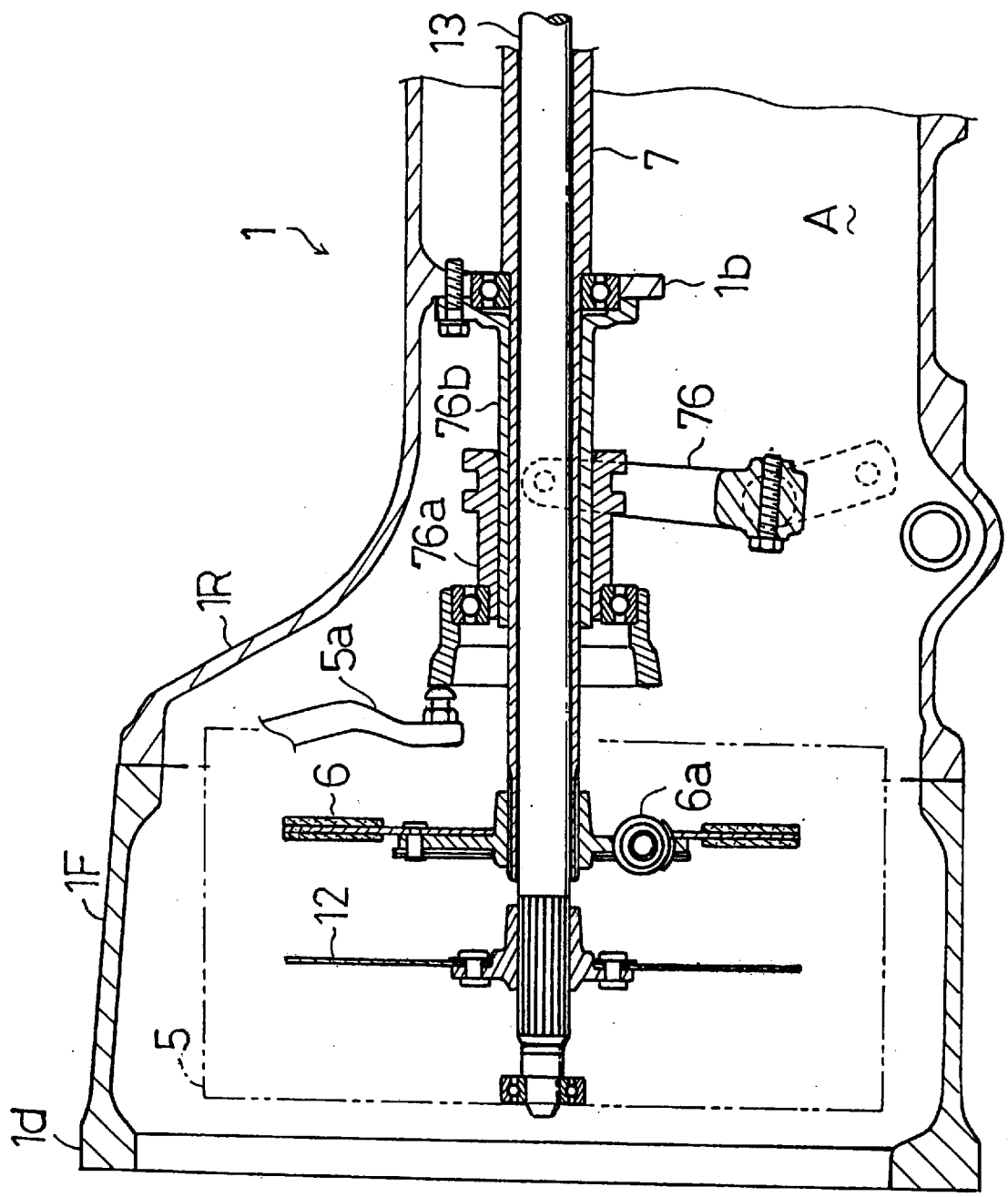
FIG. 3 is a sectional side view of a first chamber A in a transmission housing 1 showing a main-clutch system therein.

Explanation will be now given to a general inner construction of the transmission in accordance with FIG. 2 or others. An interior of transmission housing 1 is divided before and behind into a front chamber A and a rear chamber B by a partition wall 1a vertically formed at a longitudinally intermediate portion in rear housing half 1R. As shown in FIG. 3, a housing means defining front chamber A consists of front housing half 1F and a front half portion of rear housing half 1R. A front end of housing half 1F is open and is peripherally provided with a flange 1d so as to be fastened to the rear end of engine E by bolts as shown in FIG. 1. In front chamber A and in front of partition wall 1a is disposed a bearing wall 1b integrally formed by housing half 1R. A cylindrical traveling-input shaft 7 is substantially longitudinally horizontally journalled by partition wall 1a and bearing wall 1b. Shaft 7 is extended further forward from wall 1b so that a clutch disk 6 is fixed onto its front end.

In front chamber A of housing 1 is contained a flywheel 5 directly connected with a crankshaft of engine E. A main-clutch system of common dry single disk type is constructed between flywheel 5 and disk 6. As shown in FIG. 3, a cylindrical support shaft 76b is fixed at its rear end onto a front surface of wall 1b of housing 1 so that traveling-input shaft 7 is relatively rotatably inserted into shaft 76b. A release bearing 76a connected to a clutch arm 76 is axially slidably provided on shaft 76b and abuts at its front end against a lever 5a for switching operation of the main-clutch system. When a clutch pedal provided on the tractor is trod, arm 76 is rotated counterclockwise so as to slide bearing 76a forward, thereby pushing lever 5a. Thus, disk 6 is separated from flywheel 5 so that a main-clutch is disengaged. When a foot is released from the clutch pedal, arm 76, bearing 76a and lever 5a return to the position as shown in FIG. 3 by a biasing spring (not shown). Thus, disk 6 is pressed against flywheel 5 so that the main-clutch is engaged. Additionally, a damping spring 6a is inserted into disk 6 to prevent direct propagation of vibration from flywheel 5 provided integrally with engine E to traveling-input shaft 7 while rotational transmission from disk 6 pressed against flywheel 5 to shaft 7.

A first PTO transmitting shaft 13 passes through shaft 7 and extends forward from the front end thereof so as to be directly connected to flywheel 5 through a disk 12.

The main-clutch system as a unit together with flywheel 5 can be inserted into front chamber A through the front end opening of housing 1. The main clutch inserted in such a manner is supported at its intermediate portion by bearing wall 1b and at its rear end by partition wall 1a. It can be settled in front chamber A easily.

Figure 6:
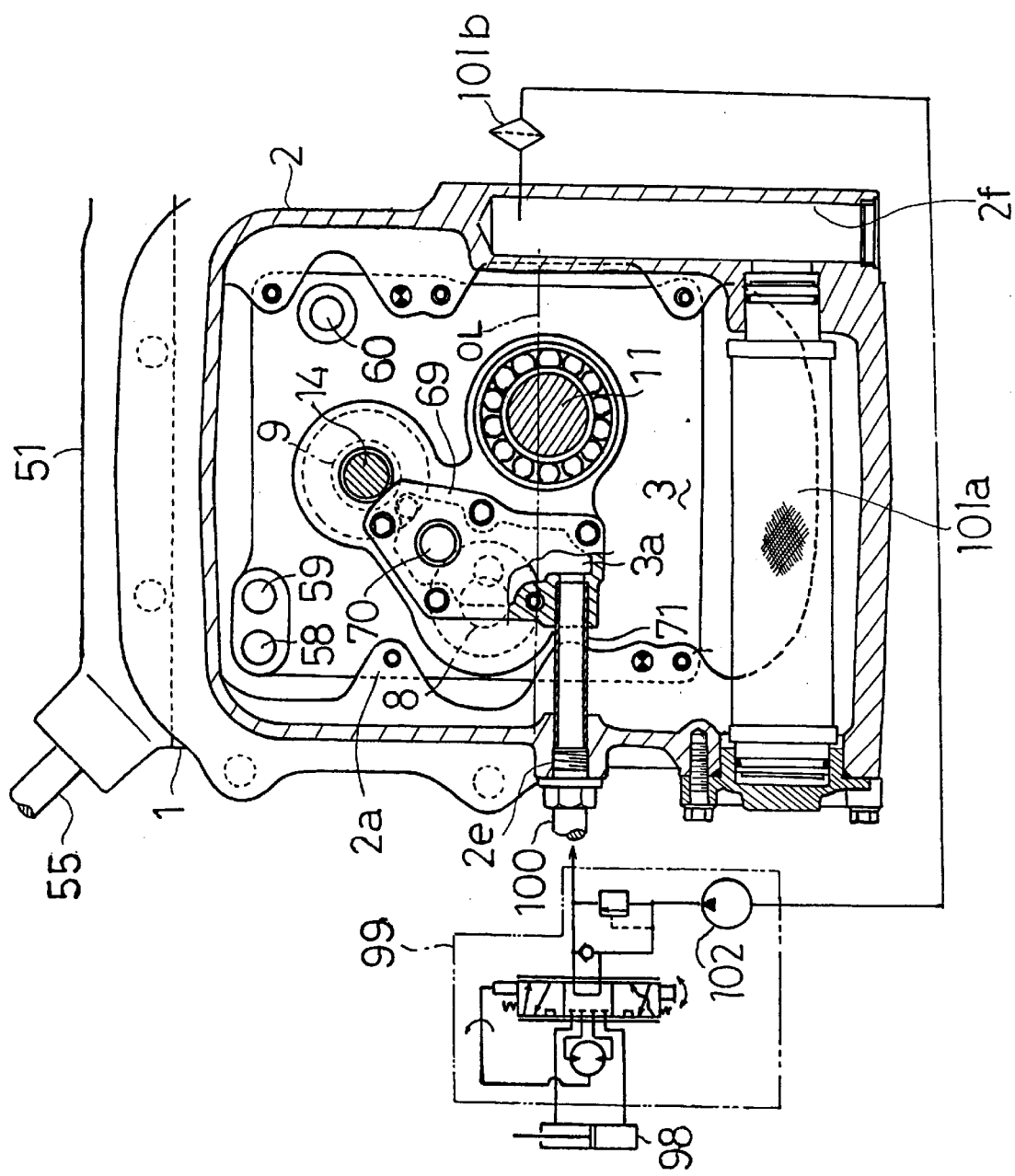
FIG. 6 is a sectional rear view of a rear axle housing 2 showing a bearing plate 3 having a lubricating oil dividing port for the speed-changing system in second chamber B.

With regard to a rear half portion of transmission housing 1, a rear open end thereof is provided with flange 1e so as to be fastened to flange 2d provided around a front end of rear axle housing 2 by bolts. A plurality of bosses 2a integrally project inwardly from the inner surface of the front end opening of housing 2. A bearing plate 3 is disposed as a rear end wall of rear chamber B so as to be fastened to front surfaces of bosses 2a by bolts as shown in FIG. 6. In this regard, similar bosses may alternatively project from the rear end opening of housing 1 for fastening plate 3.

In rear chamber B, three shafts for speed-changing are substantially longitudinally horizontally journalled in parallel with one another between wall 1a and plate 3. The three shafts are a first speed-changing shaft 8, which always rotationally follows traveling-input shaft 7, a second speed-changing shaft 9, which is disposed co-axially with shaft 7 so as to face at its front end to the rear end of shaft 7, and a traveling-output shaft 10, which is continuously connected to a propeller shaft 11 discussed below. Shaft 9 is cylindrically shaped similar to shaft 7. A second PTO transmitting shaft 14 passes through shaft 9 so as to be continuously joined with first PTO transmitting shaft 13 through a joint 95 in a rear boss 7a fixedly extending rearward from the rear end of shaft 7. A rear end of shaft 14 extends rearward from plate 3 so as to be connected to a rear-PTO clutch in housing 2.

The three speed-changing shafts 8, 9 and 10 defining a speed-changing system in the transmission are previously supported by plate 3 fixed to the front end of housing 2 before fastening housings 1 and 2 by bolts. At this time, there is shaft 14 passing through shaft 9. In housing 1, there is shaft 7 supported by wall 1a.

On fastening housings 1 and 2, shafts 8, 9 and 10 extending forward from plate 3 are inserted into housing 1 through the rear end opening thereof When flanges 1e and 2d of housings 1 and 2 are fastened to each other, the front ends of shafts 8 and 10 are inserted respectively into bearings provided in wall 1a and the front ends of shafts 9 and 14 are inserted into rear boss 7a of shaft 7. Thus, each of shafts 8, 9, 10 and 14 are naturally settled in rear chamber B simply by positioning flanges 1e and 2d in relation to each other.

Figure 10:
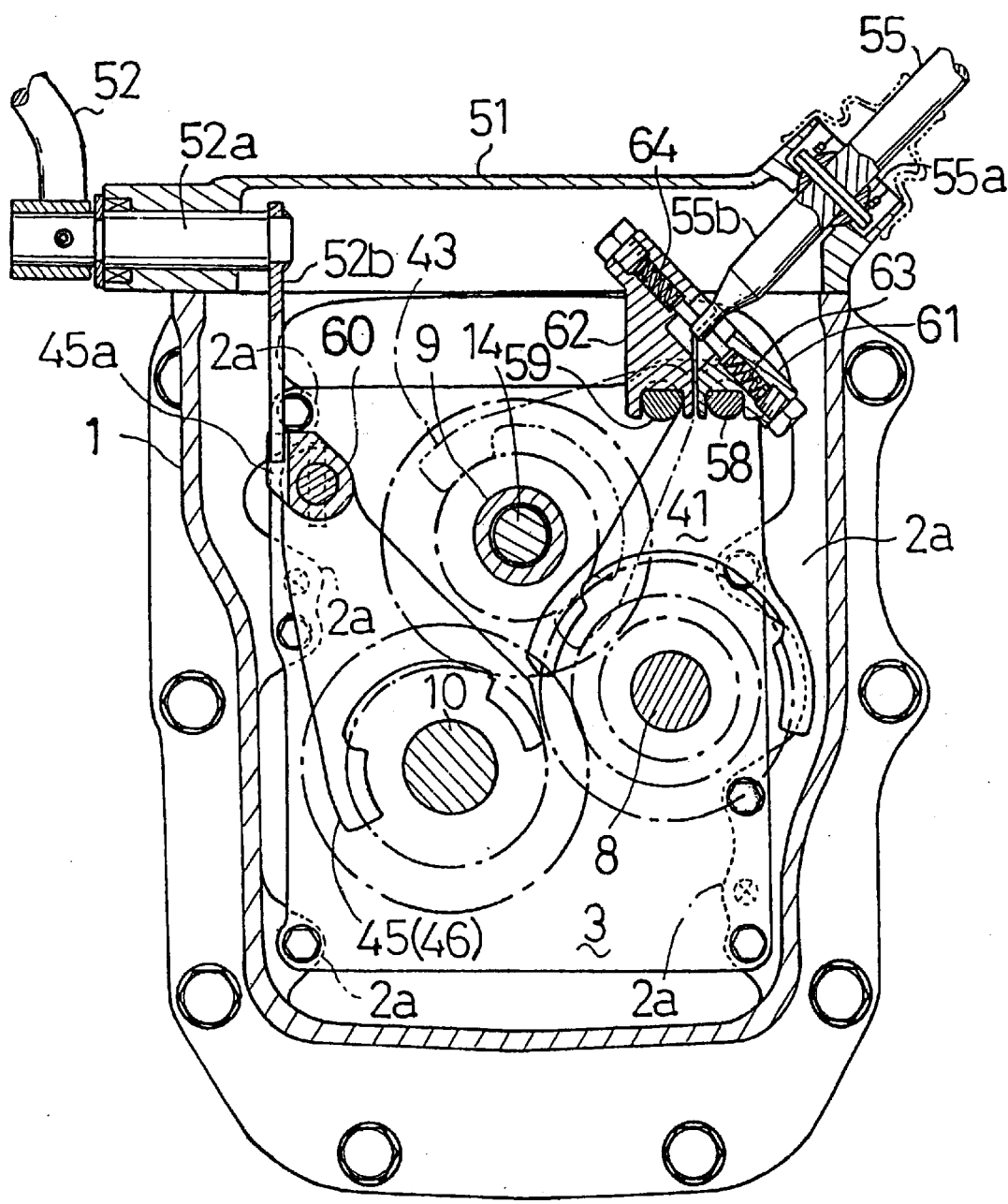
FIG. 10 is a sectional front view of second chamber B in transmission housing 1 showing clutch devices disposed therein in accordance with the first embodiment.

Referring to FIG. 10, there is shown an arrangement of shafts 8, 9, 10 and 14 in rear chamber B when viewed in front. In this regard, shafts 7 and 9 are disposed at a substantially lateral center of housing 1, thereby ensuring sufficient space on both lateral sides of shaft 9 in rear chamber B. In this embodiment, shaft 8 is disposed in the right-hand space below shaft 9 and shaft 10 is in the left-hand space thereof (Left and right are defined by viewing from the front. The same shall apply hereinafter.)

In casing 4 attached to the bottom of the portion of housing 1 forming rear chamber B are rotatably supported a support shaft 19 and front-wheel driving PTO shaft 20, so as to form a transmitting system between shafts 10 and 20 through shaft 19 and a gear train. Shaft 10 is disposed lower than shaft 8 as shown in FIG. 10, so that the transmitting system between shafts 10 and 20 can be compacted by reducing the distance between shafts 10 and 19.

Figure 4:
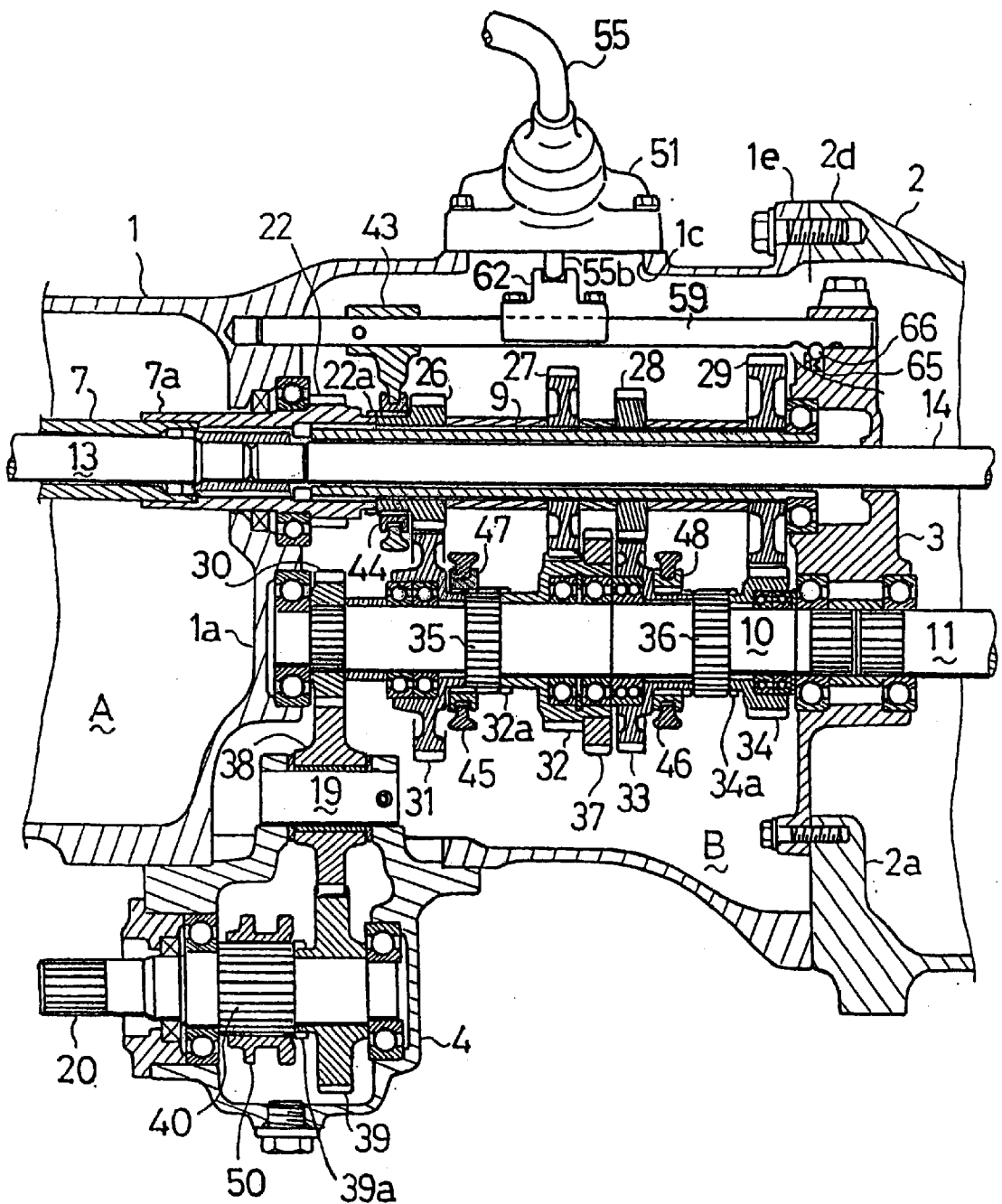
FIG. 4 is a sectional development side view of a second chamber B in a transmission housing 1 showing a speed-changing system therein and a front-wheel driving PTO unit in accordance with the first embodiment.

Housing 2 forms a first bearing wall 2b and a second bearing wall 2c before and behind therein. A rear-wheel differential 21 is disposed between walls 2b and 2c. Propeller shaft 11 is rotatably supported between plate 3 and wall 2b. As shown in FIG. 4, a front end of shaft 11 is joined with a rear end of shaft 10 through a joint 10a provided in plate 3. As shown in FIG. 2, a rear end of shaft 11 projecting inwardly from wall 2b is provided thereon with a bevel pinion 11a so as to engage with a large bevel gear of differential 21.

As shown in FIG. 2, a PTO brake casing 75 is fixed onto a front surface of wall 2b. A PTO clutch casing 73 is disposed in front of casing 75. PTO clutch disks 72 are provided on a rear end of shaft 14 projecting rearward from plate 3. A third PTO transmitting shaft 15 is disposed behind the rear end of shaft 14 along the same axis. Casing 73 is fixed on shaft 15 and contains a hydraulic piston for pressing and releasing disks 72 against and from casing 73 so as to define a hydraulic PTO clutch system of multi wet frictional disk type.

PTO brake disks 74 are provided on a boss projecting rearward from a rear surface of casing 73. Casing 75 contains a hydraulic piston for pressing and releasing disks 74 against and from casing 75 so as to define a hydraulic PTO brake system of multi wet frictional disk type. The piston of the PTO brake system acts so as to press disks 74 against casing 75 for braking shaft 15 only while the piston of the PTO clutch system is set off the PTO clutch. Shaft 15 passes through casing 75, is journalled by wall 2b and extends further rearward so as to be fixedly connected to a front end of a PTO counter shaft 16 journalled by wall 2c.

Rear cover 17 is fastened to a rear opening end of housing 2 by bolts, as best seen in FIG. 2. In housing 2, there are PTO counter shaft 16 and PTO shaft 18 rotatably supported substantially longitudinally horizontally between wall 2c and cover 17 and connected with each other through a speed-reduction gear train. A front end of shaft 16 projects forward from wall 2c so as to be joined with shaft 15.

Figure 5:
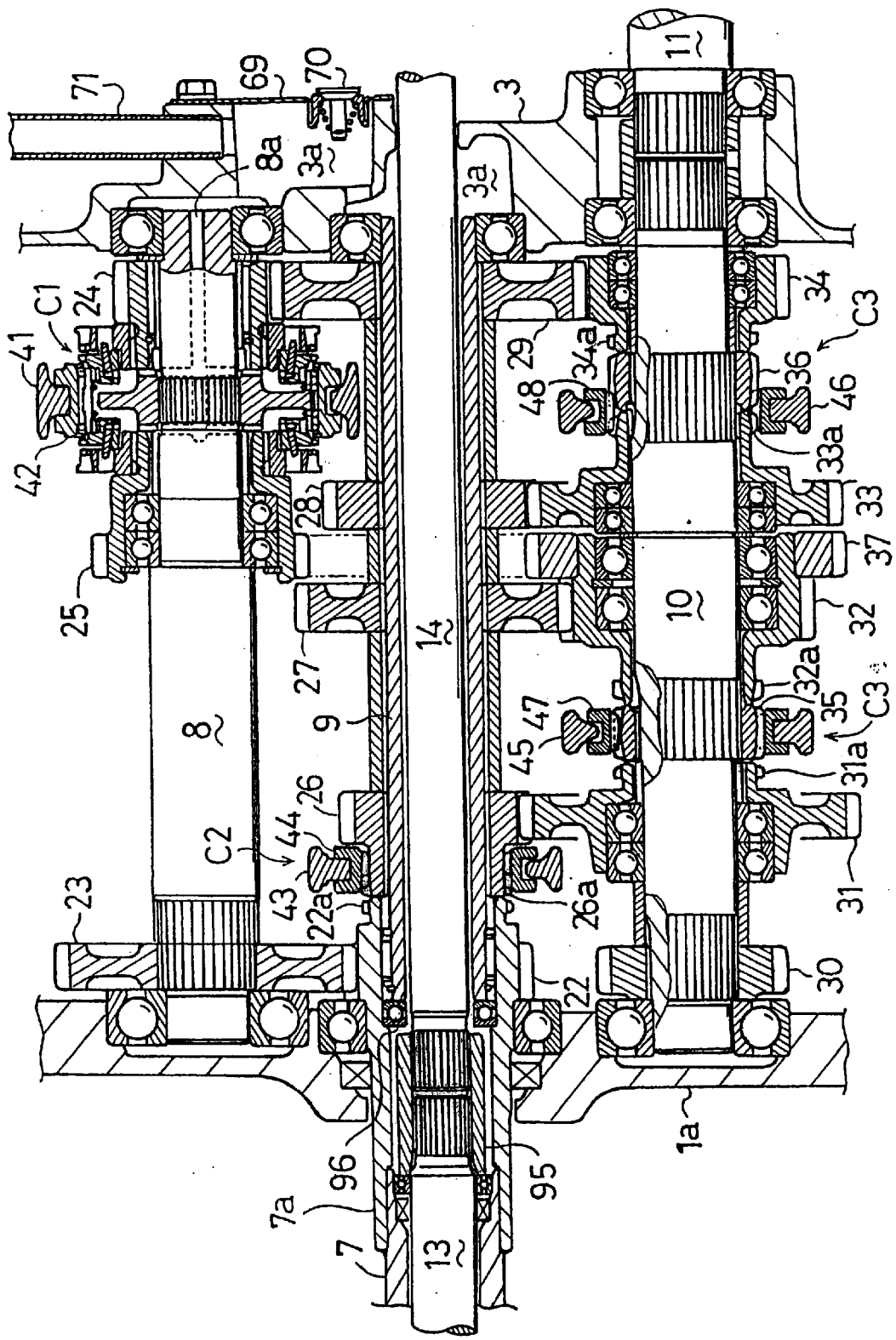
FIG. 5 is a fragmentary sectional development side view of the same showing the speed-changing system in second chamber B.

Explanation will be now given to th e detailed construction of the speed-changing system, which is contained in rear chamber B, in the above mentioned transmission for a working vehicle having a housing construction comprising housings 1 and 2 and casing 4 in accordance with FIGS. 2 and between 4 and 13. As shown in FIGS. 4 and 5, a speed-changing input gear 22 is fixed onto rear boss 7a of shaft 7 projecting into rear chamber B from wall 1a. The front end of shaft 9 is relatively rotatably supported in boss 7a through a needle bearing. A thrust be a ring 96 for receiving the thrust force from shaft 9 is disposed in boss 7a. Thus, shafts 7 and 9 are disposed sequentially on the same axis.

Figure 9:
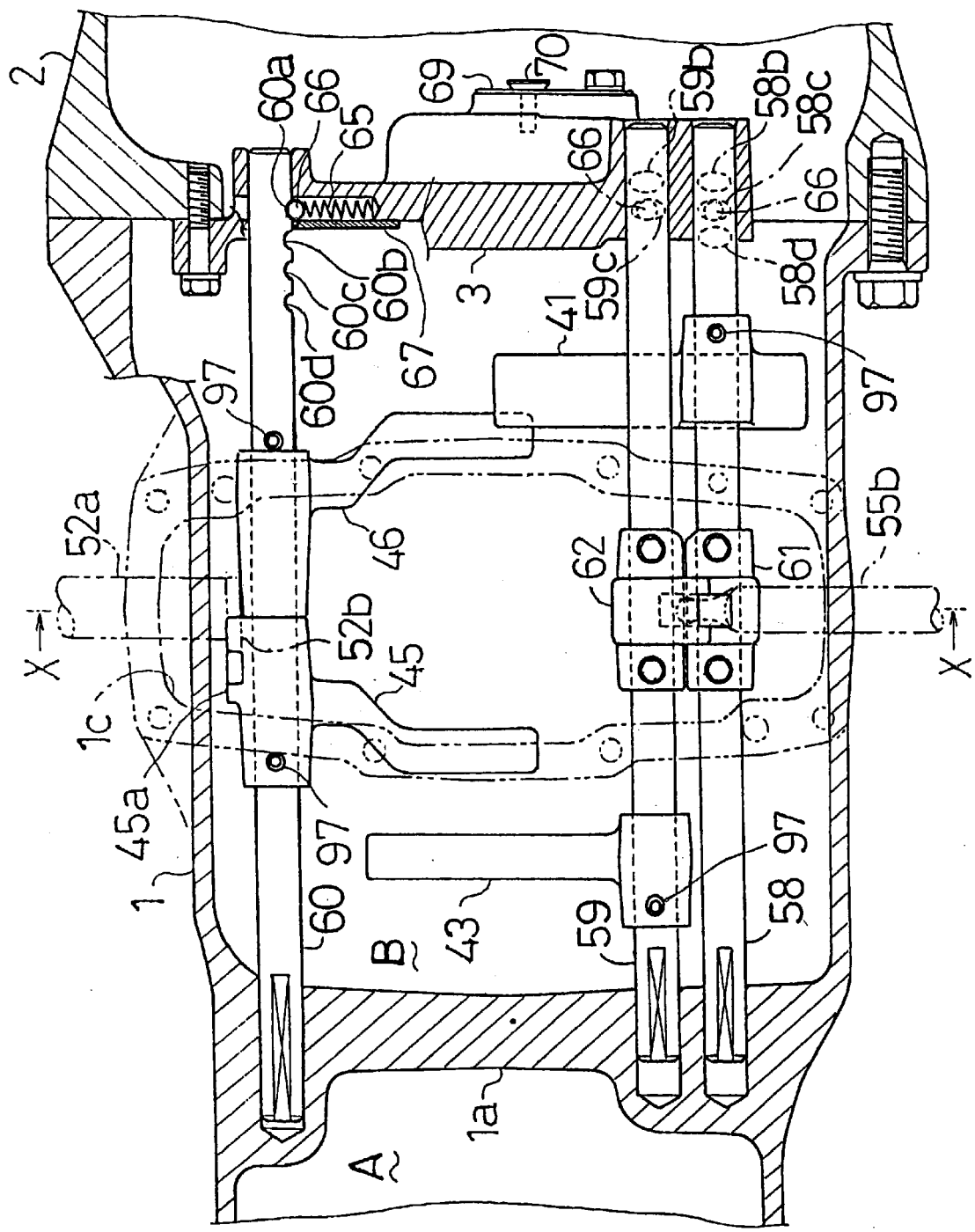
FIG. 9 is a sectional plan view of second chamber B in transmission housing 1 showing clutch fork shafts disposed therein in accordance with the first embodiment.

As shown in FIG. 5, a gear 23 is fixed on a front end portion of shaft 8 in parallel with shafts 9 and 14. Gear 23 always engages with gear 22. A first drive gear 24 and a second drive gear 25 are relatively rotatably provided on a rear half portion of shaft 8. Also, a first clutch device C1 with a synchronizer is provided thereon for selectively engaging either of gears 24 and 25 with shaft 8. First clutch device C1 can be turned into a position to engage gear 24 with shaft 8, a position to engage gear 25 with shaft 8 and a neutral position to engage none of gears 24 and 25 with shaft 8 by longitudinally slide of a clutch sleeve (a synchronizer sleeve) 42 thereof according to longitudinal motion of a clutch fork 41. As shown in FIG. 9, a clutch fork shaft 58 is longitudinally slidably spanned between wall la and plate 3 so as to pass through a boss of clutch fork 41. The boss is fixed to clutch fork shaft 58 through a spring pin 97 so as to be axially movable, whereby clutch fork 41 longitudinally slides integrally with shaft 58.

Figure 14:
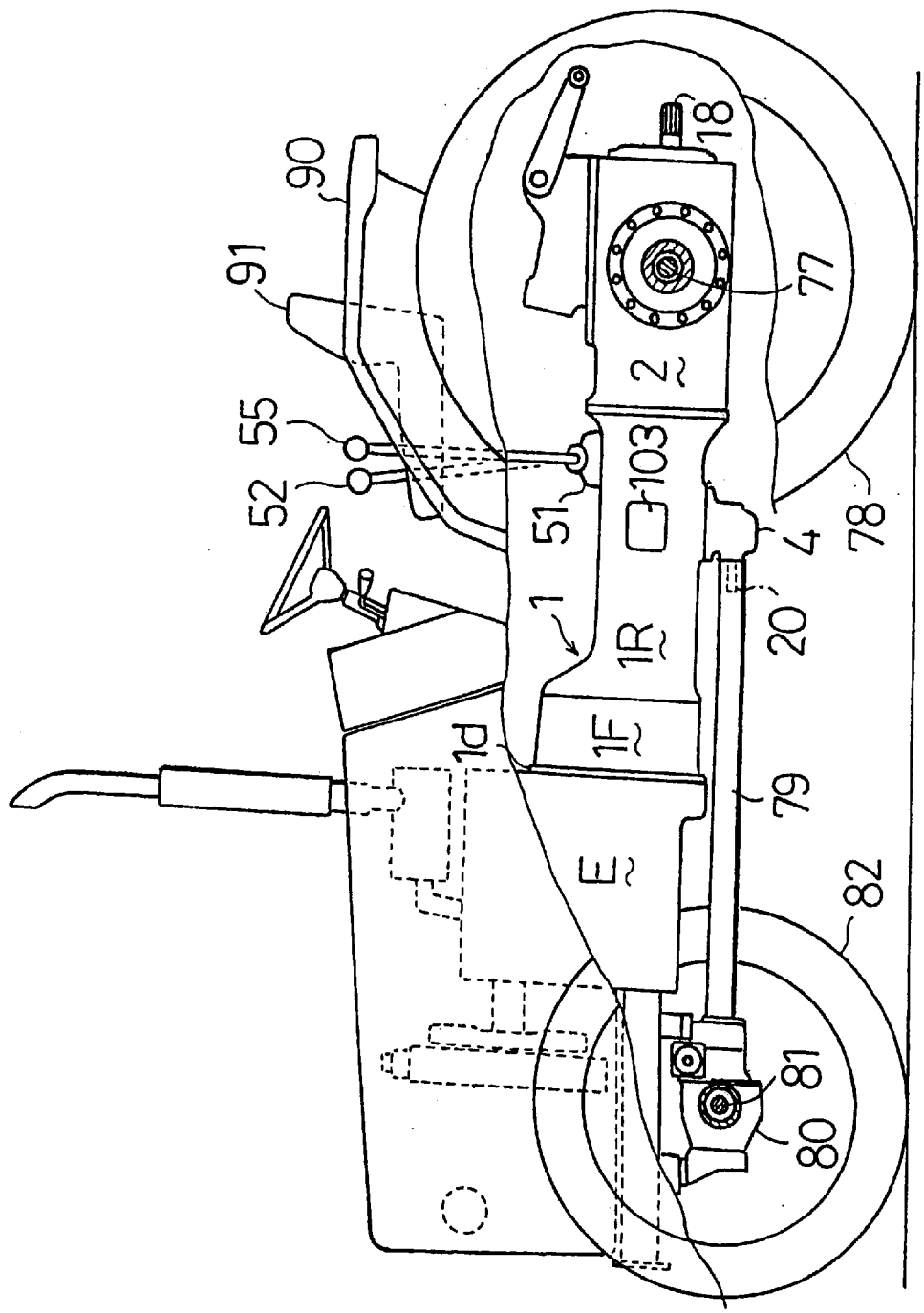
FIG. 14 is a whole side view of a tractor provided with a transmission in accordance with a second embodiment of the present invention.

Referring to FIGS. 5, 6 and 9, there is shown a mechanism for forcibly supplying lubricating oil to the synchronizer. An oil sump 3a is formed in plate 3 which supports the rear end of shaft 8. An oil conduit 71 in communication with sump 3a is connected to a side surface of plate 3 so as to communicate with an oil hole 2e which is open at an outer side surface of housing 2. Into hole 2e is led oil drained from a hydraulic device provided on a vehicle (e.g., a power steering device for front wheels or hydraulic lifting device 92) through a conduit 100. In this embodiment, the oil drained from a pressure oil supplying and draining circuit 99 for a power steering cylinder 98 is used. Additionally, as shown in FIG. 14, for the purpose of supplying circuit 99 with surplus oil in housing 2 as pressure oil for cylinder 98, a strainer 101a is spanned in vicinity of a front bottom portion of housing 2 so as to cross shaft 11. The lubricating oil absorbed into strainer 101a is taken out from housing 2 through an oil suction passage 2f in a side wall of housing 2 and a line filter 101b attached onto the side wall and is charged into circuit 99 by a hydraulic pump M. If the oil drained from hydraulic lifting device 92 is led into housing 2, a hydraulic cylinder for lift arms 93 should replace cylinder 99 and a pressure oil charging and draining circuit in device 92 should replace circuit 99.

As shown in FIG. 5, a lubricating oil passage 8a is bored in shaft 8. Exit of passage 8a is open at the round surface of shaft 8 near splines provided thereon for fitting to the synchronizer. Entrance of passage 8a is open at the rear end surface of shaft 8 so as to communicate with sump 3a, thereby forcibly supplying a frictionable portion of the synchronizer with lubricating oil. Sump 3a is a recessed portion of the rear surface of plate 3 and is covered with a lid 69. A relief valve 70 for limiting the pressure of lubricating oil is attached to lid 69. When the pressure of oil led into sump 3a exceeds the limit thereof, the surplus oil is drained into housing 2 behind sump 3a. As shown in FIGS. 5 and 6, sump 3a is also made to supply lubricating oil into the space between shafts 9 and 14 or its vicinity (e.g., bearing 96 and splines of shaft 14) which requires lubrication. Thus, sump 3a has distributive function of lubricating oil.

Onto the front end of shaft 9 is fixed a first-speed drive gear 26 forming a clutch gear 26a at its front end. A rear end of gear 22 is formed into a clutch gear 22a, which is disposed just before gear 26a. Between gears 26a and 22a is disposed a longitudinally slidable clutch sleeve 44 which engages with a clutch fork 43, thereby constructing a second clutch device C2. As shown in FIG. 9, a clutch fork shaft 59 longitudinally slidably spanned between wall 1a and plate 3 passes through a boss of clutch fork 43. The boss is fixed onto shaft 59 through a spring pin 97, whereby clutch fork 43 slides integrally with shaft 59.

Second clutch device C2 can be changed into a state that sleeve 44 engages with only gear 26a so as to separate shafts 7 and 9 from each other and a state that sleeve 44 engages with both gears 26a and 22a so as to connect shafts 7 and 9 with each other directly. In the former state, the rotational power of shaft 7 is transmitted to shaft 8 through the speed reduction gear train of gears 22 and 23 and is transmitted to shaft 9 through either gear 24 or 25 clutched on by sleeve 42. In the latter state, the rotational power of shaft 7 is directly transmitted into shaft 9. At this time, shaft 10 rotationally follows shaft 9 in the direction for advancing of a vehicle.

Second clutch device C2 is so restricted that clutch fork 43 can slide forward so as to move sleeve 44 to the position where it engages with both gears 26a and 22a(i.e., a clutching on position thereof) only when first clutch device C1 is neutral. Thus, when second clutch device C2 is engaged, shaft 8 runs idle and does not drive shaft 9, whereby shaft 9 directly driven by shaft 7 can be prevented from receiving double driving powers.

On the contrary, first clutch device C1 is so restricted that either gear 24 or 25 can engage with shaft 8 only when sleeve 44 is set at the position where it engages with only gear 26a(i.e., a neutral position of second clutch device C2). Thus, the route of power transmitting between shafts 7 and 9 through shaft 8 can be ensured.

The restrictive mechanism of sleeves 42 and 44 having the above mentioned functions will be detailed in following description about the relation of the speed-changing system in rear chamber B to levers 55 and 52.

Onto shaft 9 are fixed first-speed drive gear 26 having gear 26a, a third-speed drive gear 27, a second-speed drive gear 28 and a fourth-speed drive gear 29 in order from front to rear. On shaft 10 are rotatably provided a first-speed driven gear 31, a third-speed driven gear 32, a second-speed driven gear 33 and the fourth-speed driven gear 34 in order from front to rear, and are fixed a pair of splined hubs 35 and 36 so as to be disposed respectively between gears 31 and 32 and between gears 33 and 34. Gears 31, 32, 33 and 34 always engage respectively with gears 26, 27, 28 and 29 on shaft 9.

Gear 29 also always engages with gear 24 on shaft 8, whereby both gears 24 and 29 constitute a regularly rotational speed-reduction gear train. When gear 24 engages with shaft 8 by first clutch device C1, power from gear 24 is transmitted into shaft 9 through gear 29. The rotary speed of shaft 10 which rotationally follows shaft 9 in the direction for advancing of a vehicle is slower than that when second clutch device C2 is engaged.

An idling gear 37 is provided on a boss of gear 32 so as to be close to gear 32. Gear 25 on shaft 8, gears 37 and 32 on shaft 10 and gear 27 on shaft 9 constitute a reversing gear train. When gear 25 engages with shaft 8 by first clutch device C1, power from gear 25 is transmitted into shaft 9 through gears 37, 32 and 27. At this time, shaft 9 rotates shaft 10 in the direction for reversing of the vehicle.

On ends of bosses of gears 31 and 32 facing hub 35 are respectively provided clutch gears 31a and 32a. A front clutch sleeve 47 is disposed around hub 35 so as to engage with hub 35. Sleeve 47 is rotatable with hub 35 and is axially slidable, so that it can engage with either gear 31a or 32a. A front clutch fork 45 is anchored into a peripheral channel of sleeve 47.

Similarly, on ends of bosses of gears 33 and 34 facing hub 36 are respectively provided clutch gears 33a and 34a. A rear clutch sleeve 48 is disposed around hub 36 so as to engage with hub 36. Sleeve 48 is rotatable with hub 36 and is axially slidable, so that it can engage with either gear 33a or 34a. A rear clutch fork 46 is anchored into a peripheral channel of sleeve 48.

As shown in FIG. 9, a clutch fork shaft 60 passes through bosses of clutch forks 45 and 46. Clutch fork 45 is fixed to shaft 60 through spring pin 97. Clutch fork 46 is rotatable around shaft 60 and is not axially slidable because of another spring pin 97 inserted into shaft 60 as a stopper. Thus, on assembling the speed-changing system, clutch forks 45 and 46 can be anchored respectively to sleeves 47 and 48 easily, thereby constructing the third clutch device C3 easily.

Clutch forks 45 and 46 and clutch fork shaft 60 are axially moved together by a rectilinear operation of second speed-change lever 52, whereby sleeves 47 and 48 integrally slide back and forth. On shaft 10 is provided a third clutch device C3 comprising front clutch sleeve 47 and clutch gears 31a and 32a on both sides of sleeve 47, and rear clutch sleeve 48 and clutch gears 33a and 34a on both sides of sleeve 48. Third clutch device C3 is shifted among four positions as a first-speed position, a second-speed position, a third-speed position and a fourth-speed position by simultaneous sliding of both sleeves 47.

At the first-speed position, clutch gear 31a of first-speed driven gear 31 is connected with splined hub 35 through sleeve 47. Clutch sleeve 48 engages with only clutch gear 33a of second-speed driven gear 33. Thus, first-speed driven gear 31 engages with shaft 10, so that rotational power of shaft 9 is transmitted to shaft 10 through a first speed gear train of gears 26 and 31.

At the second-speed position (shown in FIG. 5), sleeve 47 engages with only hub 35 and sleeve 48 connects gear 33a to hub 36, whereby second-speed driven gear 33 engages with shaft 10, so that rotational power of shaft 9 is transmitted to shaft 10 through a second-speed gear train of gears 28 and 33.

At the third-speed position, sleeve 48 engages with only hub 36 and sleeve 47 engages with both clutch gear 32a of third-speed driven gear 32 and hub 35, whereby gear 32 engages with shaft 10, so that rotational power of shaft 9 is transmitted to shaft 10 through a third-speed gear train of gears 27 and 32.

At the fourth speed position, sleeve 47 engages with only gear 32a and sleeve 48 engages with both hub 36 and clutch gear 34a of fourth-speed driven gear 34, whereby gear 34 engages with shaft 10, so that rotational power of shaft 9 is transmitted to shaft 10 through a fourth-speed gear train of gears 29 and 34.

Next, explanation will be given to the transmitting system from the speed-changing system in rear chamber B to front-wheel driving PTO shaft 20 in accordance with FIG. 4.

A front-wheel drive gear 30 is fixed onto a portion of shaft 10 close to wall 1a as a front end wall of rear chamber B. Support shaft 19 spanned in casing 4 is inserted into rear chamber B through the bottom opening of housing 1, so that a gear 38 rotatably provided on shaft 19 always engages with gear 30. Gear 38 also always engages with a front-wheel drive input gear 39 fixed on shaft 20 journalled in casing 4.

Moreover, a splined hub 40 is fixed onto shaft 20. A front-wheel drive switching sleeve 50 is axially slidably provided on shaft 20 between hub 40 and a clutch gear 39a formed by gear 39. Clutch sleeve 50 is shifted between a position where it engages with only hub 40, and a position where it connects hub 40 and gear 39a with each other, by operation of lever or the like. When sleeve 50 is at the former position, front wheels 82 are not driven, whereby a vehicle (a tractor) travels by drive of only rear wheels 78. When at the latter position, power is transmitted from the speed-changing system in rear chamber B to front wheels 82 whereby the vehicle travels at four wheel drive.

Next, explanation will be given on an attaching construction of main (second) speed change lever 52 and sub (first) speed-change lever 55 as operating tools for the speed-changing system in rear chamber B and on linkages interposed between levers 52 and 55 and the speed-changing system in gear chamber B. An arrow F shown in FIG. 8 points to the front of the vehicle.

Figure 7:
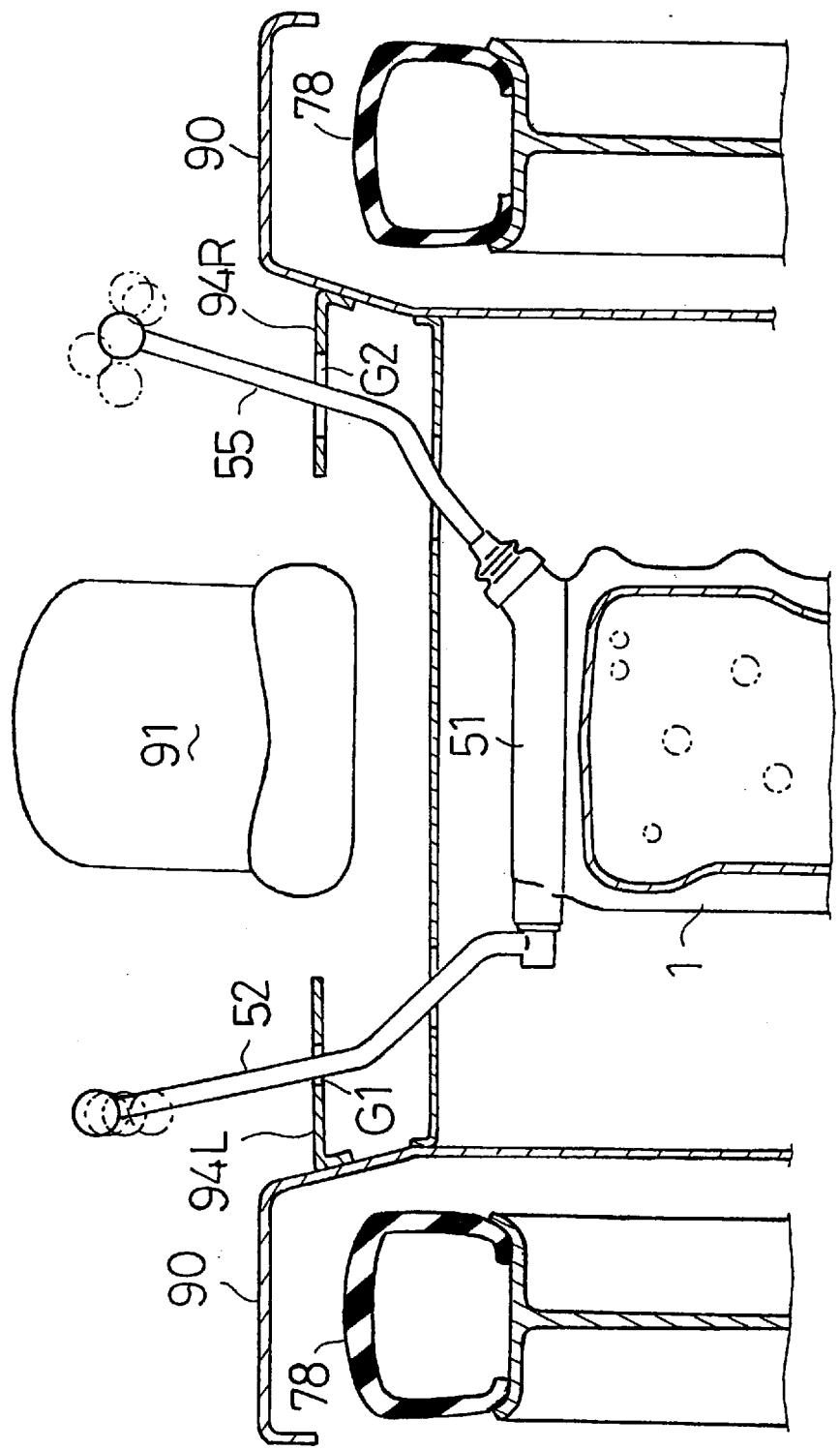
FIG. 7 is a sectional front view of the tractor showing a seat and speed-changing levers in accordance with the first embodiment.
Figure 8:
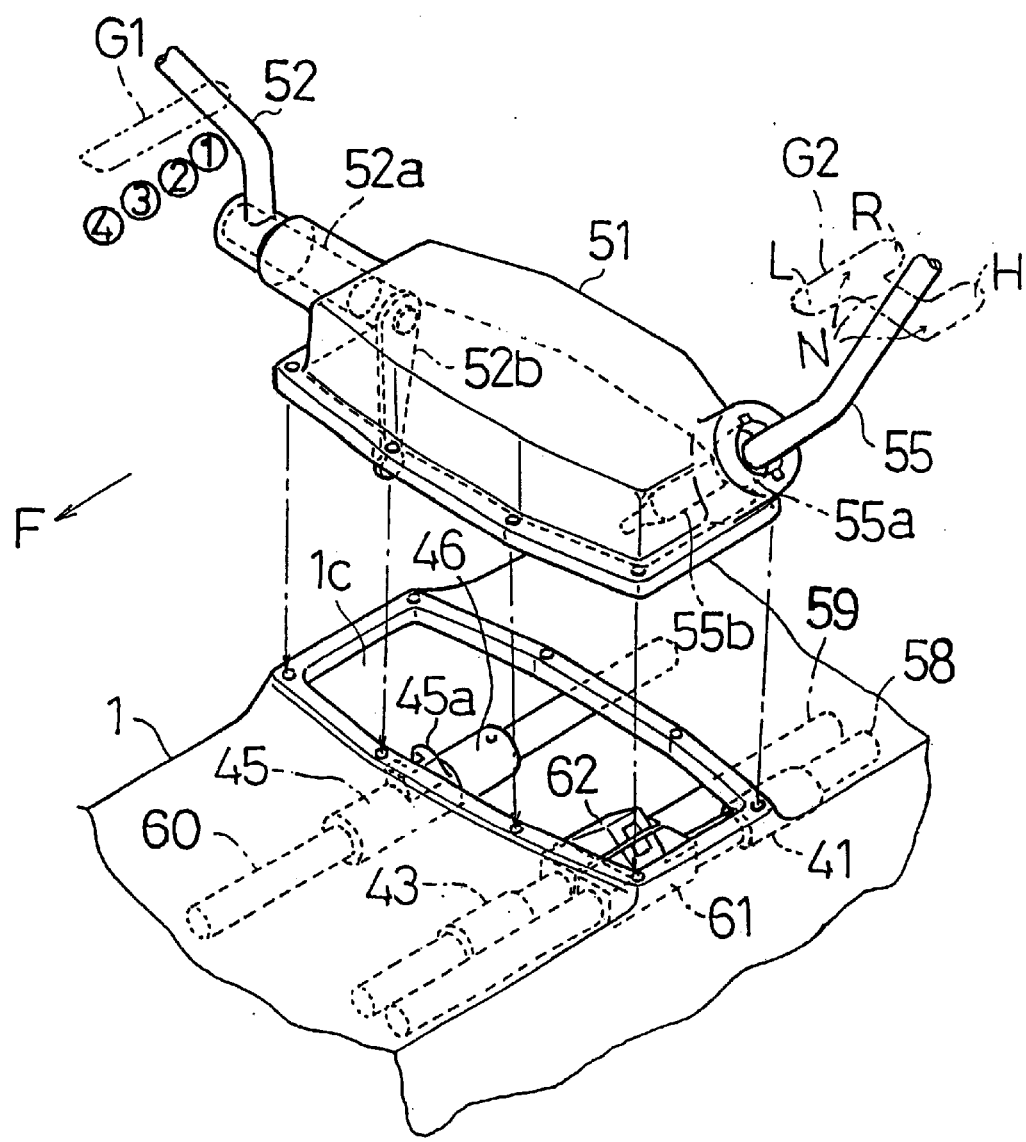
FIG. 8 is an exploded perspective view of transmission housing 1 showing that a cover 51 supporting speed-changing levers is attached to housing 1 in accordance with the same embodiment.

As shown in FIG. 7, levers 52 and 55 are disposed respectively at both sides of an operator's seat 91. Guide plates 94L and 94R are disposed respectively between left fender 20 and seat 91 and between right fender 20 and seat 91. Lever 52 passes through a guide slot G1 in plate 94L, and is supported by a left side portion of a cover 51 mounted on an upper surface of a portion of housing 1 forming rear chamber B therein. Lever 55 passes through a guide slot G2 provided in plate 94R and is supported by a right side portion of cover 51. As shown in FIG. 8, cover 51 is attached to housing 1 so as to cover an opening 1c at the upper surface thereof.

As shown in FIG. 8, lever 52 is fixed at its basic end portion onto an outer end of a rotative shaft 52a journalled in the left side wall of cover 51, so that lever 52 can be rectilinearly shifted among a first speed position I, a second speed position II, a third speed position III and a fourth speed position IV, which are positioned along I-like shaped guide slot G1. A ball shaped supporter 55a is fixed onto a basic end position of lever 55 inserted into the right side wall of cover 51 and is retained in the right corner portion of cover 51, so that lever 55 can be shifted among a low-speed advancing position L, a reversing position R, a neutral position N and a high-speed advancing position H, which are positioned along h-like shaped guide slot G2. In cover 51, a connecting arm (an operating shaft) 52b is fixed onto an inner end of shaft 52a and an engaging pin (an operating shaft) 55b is extended downward slantingly from supporter 55a.

As shown in FIGS. 8 to 10, in an upper right corner space of gear chamber B in housing 1 just below opening 1c are longitudinally axially juxtaposed clutch fork shafts 58 and 59 and in an upper left corner space thereof is longitudinally axially disposed clutch fork shaft 60. Each of shafts 58, 59 and 60 is longitudinally slidably journalled between wall 1a and plate 3 and can be located by each of detent mechanisms provided within plate 3. The boss of clutch fork 45 pierced by shaft 60 forms a connecting portion 45a on its side surface, whereby an utmost end of arm 52b is inserted into portion 45a. Instead of portion 45a, a similar connecting portion may be provided on a side surface of the boss of clutch fork 46.

Bosses of clutch forks 41 and 43 are fixed respectively on shafts 58 and 59. As shown in FIG. 11, upper surfaces of shafts 58 and 59 disposed directly below opening 1c are partly cut horizontally, so as to form settling surfaces 58a and 59a respectively. Connecting members 61 and 62 for engaging with pin 55b are provided on their bottom surfaces with recessed channels. The bottom channels of members 61 and 62 is settled respectively on surfaces 58a and 59, so that members 61 and 62 are fastened respectively to shafts 58 and 59 by bolts.

When cover 51 is removed from housing 1, arm 52b and pin 55b are naturally removed respectively from portion 45a and either member 61 or 62, so that levers 52 and 55 can be separated from the speed changing system in housing 1 quickly. After housings 1 and 2 are joined with each other and shafts 58 and 59 are disposed in rear chamber B, members 61 and 62 can be inserted into housing 1 through opening 1c so as to be attached to shafts 58 and 59.

In a state that cover 51 provided with levers 52 and 55 is settled on top of housing 1 and levers 52 and 55 are connected to the speed-changing system, when lever 52 is shifted along slot G1, the pair of clutch forks 45 and 46 integral with shaft 60 longitudinally slide according to shifting of lever 52 through arm 52b and portion 45a, so that the pair of sleeves 47 and 48 are shifted among the above mentioned four speed positions.

Pin 55b is made to engage with either member 61 or 62 by lateral motion of lever 55. In case of pin 55b engaging with member 61, when lever 55 is longitudinally shifted, sleeve 42 is shifted among three positions of reversing position R, neutral position N and low-speed advancing position L through shaft 58 and clutch fork 41. In case of pin 55b engaging with member 62, when lever 55 is longitudinally shifted, sleeve 44 is shifted between two positions of high-speed advancing position H and neutral position N through shaft 59 and clutch fork 43.

Members 61 and 62 are provided on their tops with successively slanting portions. At an upper end of the slanting portion of member 61 and at a lower end of the slanting portion of member 62 are provided recessed portions. Both the recessed portions face each other so as to be arranged on a lateral slanting line when both shafts 58 and 59 are at their neutral positions. In this state, pin 55b can move between the recessed positions of members 61 and 62 by lateral motion of lever 55 along slot G2. As shown in FIGS. 10 and 11, member 61 is provided with a biasing member 63 for biasing pin 55b toward member 62 and member 62 is provided with a biasing member 64 for biasing pin 55b toward member 61. Biasing members 63 and 64 are disposed respectively in through-holes 61a and 62a which penetrate respectively in members 61 and 62 so as to communicate with the recessed portions thereof. Member 63 comprises pin 63a for abutting against the utmost end of pin 55b, plug 63b for plugging an outside opening of through-hole 61a and a spring 63c interposed between pin 63a and plug 63b for pushing pin 63a toward Pin 55b. Member 64 similarly comprises a pin 64a, a plug 64b and a spring 64c. When both shafts 58 and 59 arc positioned at their neutral position, pin 55b receives both biasing forces of pins 63a and 64a, so as to be positioned at the middle between members 61 and 62, whereby lever 55 is positioned at neutral position N of slot G2. For anchoring pin 55b to either member 61 or 62, lever 55 is vertically swung on centering supporter 55a against biasing forces of springs 63c and 64c.

Figure 12:
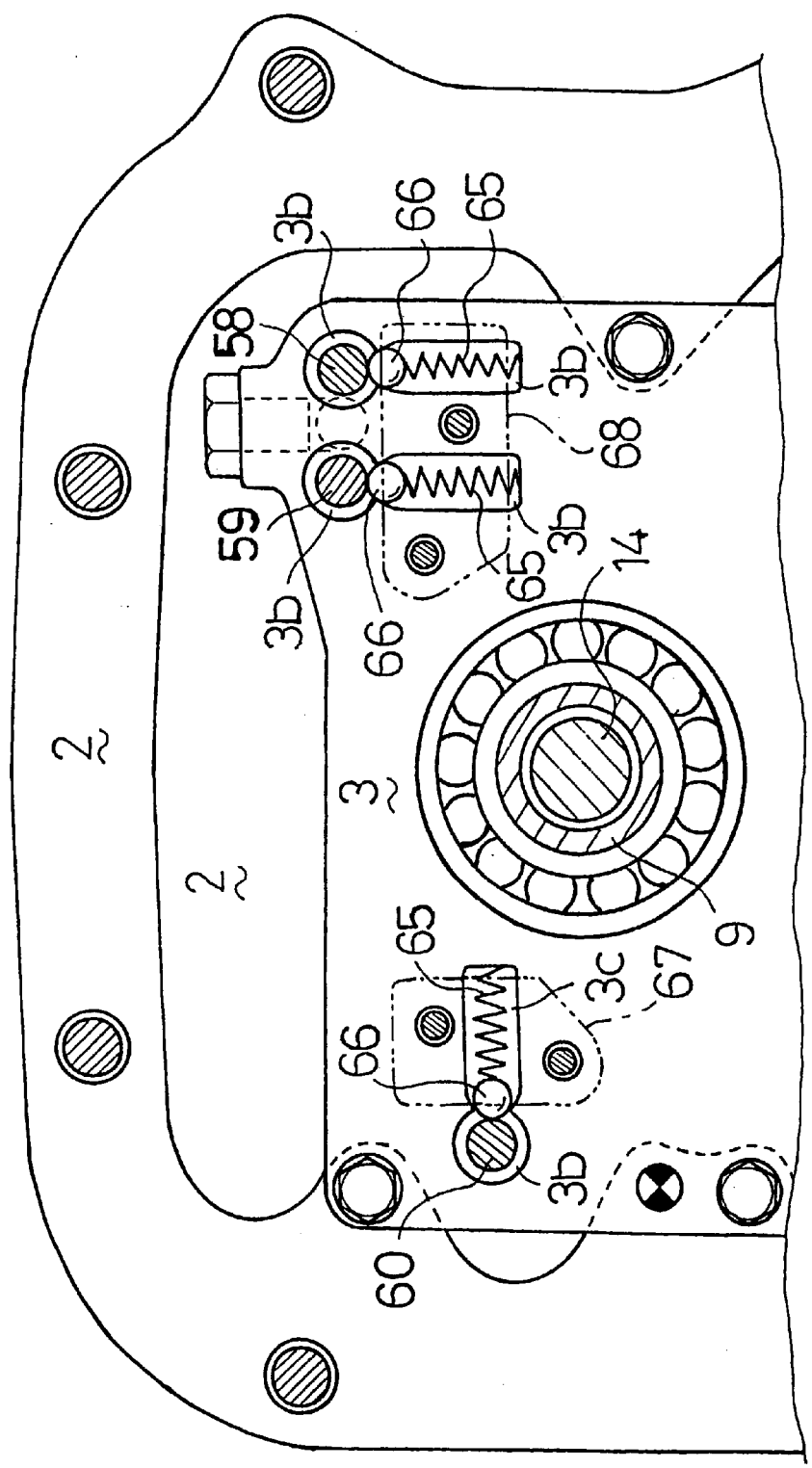
FIG. 12 is a fragmentary front view of rear axle housing 2 showing bearing plate 3 having detent mechanisms for clutch fork shafts in accordance with the first embodiment.
Figure 13:
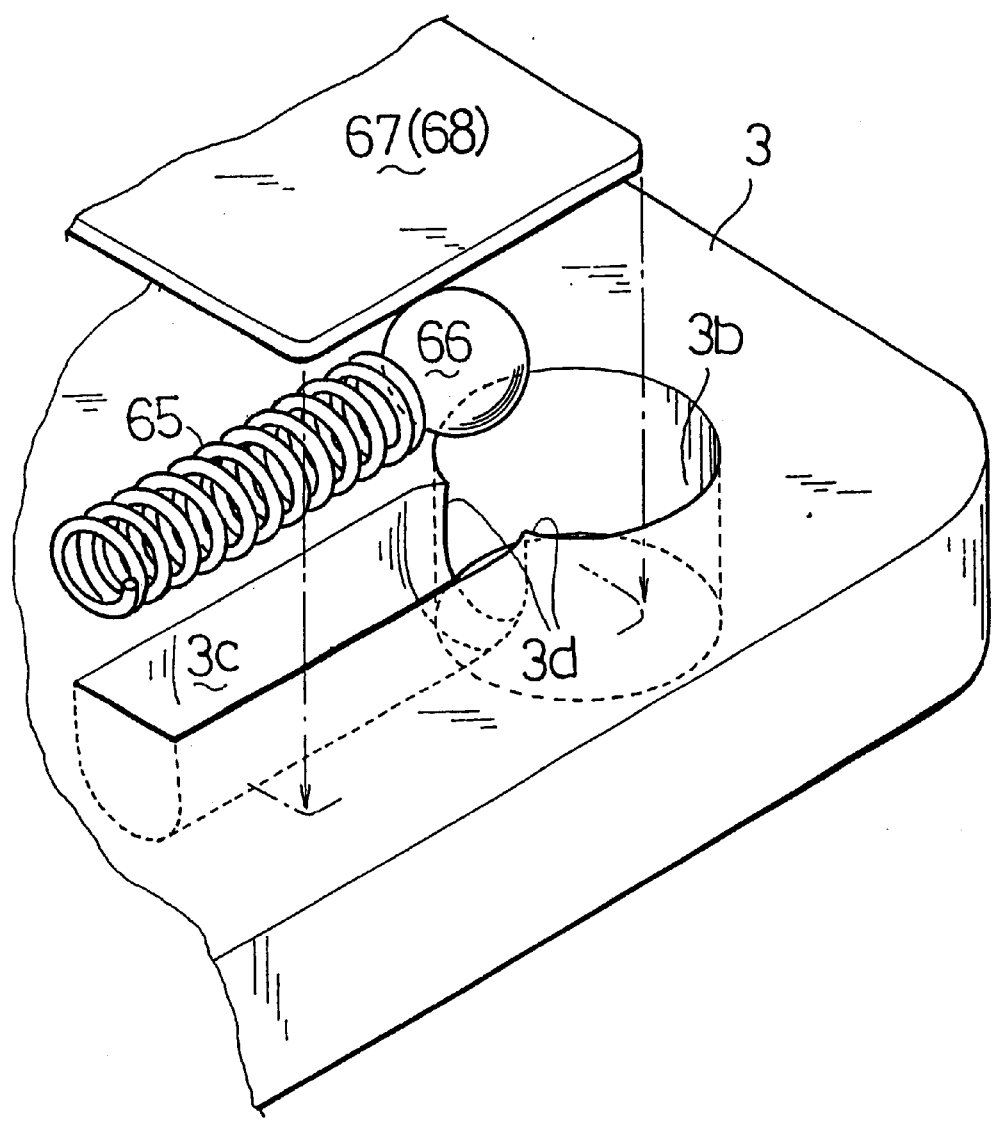
FIG. 13 is an exploded perspective view of a detent mechanism in bearing plate 3.

Referring to FIGS. 9, 12 and 13, there are shown the detent mechanisms for locating shafts 58, 59 and 60. The detent mechanisms are disposed in plate 3. As shown in FIG. 12, three holes 3b are bored in plate 3 for journalling shafts 58, 59 and 60 respectively therein. Plate 3 is provided on the front surface thereof with three channels 3c which is rectangular when viewed in front and is sectionally U-like shaped (as shown lit FIG. 13). Channels 3c communicate with holes 3b respectively. A biasing spring 65 and a detent ball 66 are inserted into each channel 3c so that an utmost end of ball 66 faces each hole 3b. After insertion of springs 65 and balls 66, covers 67 and 68 are fastened to the front surface of plate 3 so as to cover openings of channels 3c respectively. As shown in FIG. 13, each joint portion 3d between each channel 3c and each hole 3b is so narrow that only the utmost end of ball 66 projects into hole 3b through portion 3d, thereby preventing ball 66 from entering hole 3b when each of shafts 58, 59 and 60 is removed from hole 3b.

As shown in FIG. 9, shaft 58 is provided with three detent channels of a reversing index channel 58b, a neutral index channel 58c and a low-speed-advancing index channel 58d in order from behind to before. Shaft 59 is provided with two detent channels of a high-speed-advancing index channel 59b and a neutral index channel 59c in the same order. Shaft 60 is provided with four detent channels of a first-speed index channel 60a, a second-speed index channel 60b, a third-speed index channel 60c, and a fourth-speed index channel 60d in the same order. Each ball 66 selectively enters one of detent channels of each shaft 58, 59 or 60 by sliding location of shaft 58, 59 or 60 in each hole 3b.

With regard to the speed-changing system of the transmission for a working vehicle in accordance with this embodiment as shown in FIGS. 1 to 13, lever 55 can be shifted among four positions L, H, R and N, and in each of speed ranges defined by three positions L, H and R of lever 55, four speed stages can be selected by shift of lever 52 among four speed positions I, II, III and IV, whereby the transmission of this embodiment can provide eight advancing speed stages and four reversing speed stages in total Next, explanation will be given on a modification of the above mentioned transmission in accordance with FIGS. 14 to 20. Like reference numbers indicate identical or functionally similar elements as those of the first embodiment shown in FIGS. 1 to 13 although their figures or constructions are changed.

With regard to an exterior of the transmission of this embodiment, in FIG. 14, housings 1 and 2 are longitudinally joined with each other and casing 4 and cover 51 are attached to housing 1 similarly to the first embodiment. For a different point, a portion of housing 1 forming rear chamber B therein is provided at a side wall thereof with an opening 1d shown in FIG. 17 which is removably covered with a lid 103 shown in FIG. 14.

Figure 15:
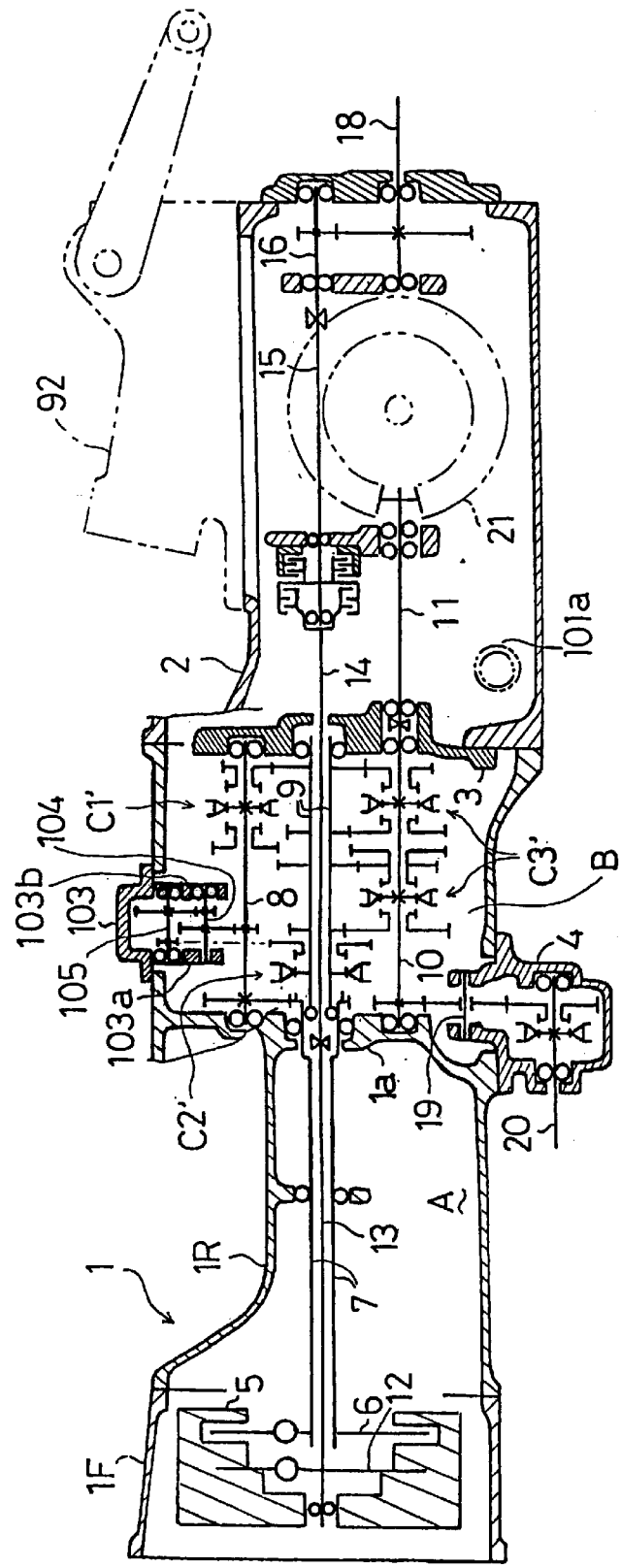
FIG. 15 is a schematic sectional side view of housings for the transmission and a diagram of the transmitting system therein in accordance with the second embodiment.

General explanation will be given on the inner construction of the transmission of this embodiment in accordance with FIG. 15 and others.

Similarly to the first embodiment, the interior of housing 1 is divided before and behind by wall 1a into front chamber A and rear chamber B. Plate 3 is disposed between the rear end of the interior of housing 1 and the front end of the interior of housing 2, thereby dividing the interior of housing into rear chamber B and the interior of housing 2. The respective transmitting constructions including transmitting shafts, gears and the like in front chamber A and housing 2 are similar with those of the first embodiment.

A transmitting construction in rear chamber B is peculiar to this embodiment. In this regard, a first creeper shaft 104 and a second creeper shaft 105 constituting a creeper transmitting mechanism are journalled between a pair of bearing walls 103a and 103b projecting from an inner surface of lid 103 into rear chamber B so as to be disposed in rear chamber B in addition to shafts 8, 9, 10 and 14 disposed in rear chamber B and shafts 19 and 20 in casing 4 communicating with rear chamber B. For creeping or superlatively decelerating shafts 10 and 11, a creeper transmitting gear train from shaft 8 to shaft 9 through shafts 104 and 105 is constructed as the discussed below.

Figure 16:
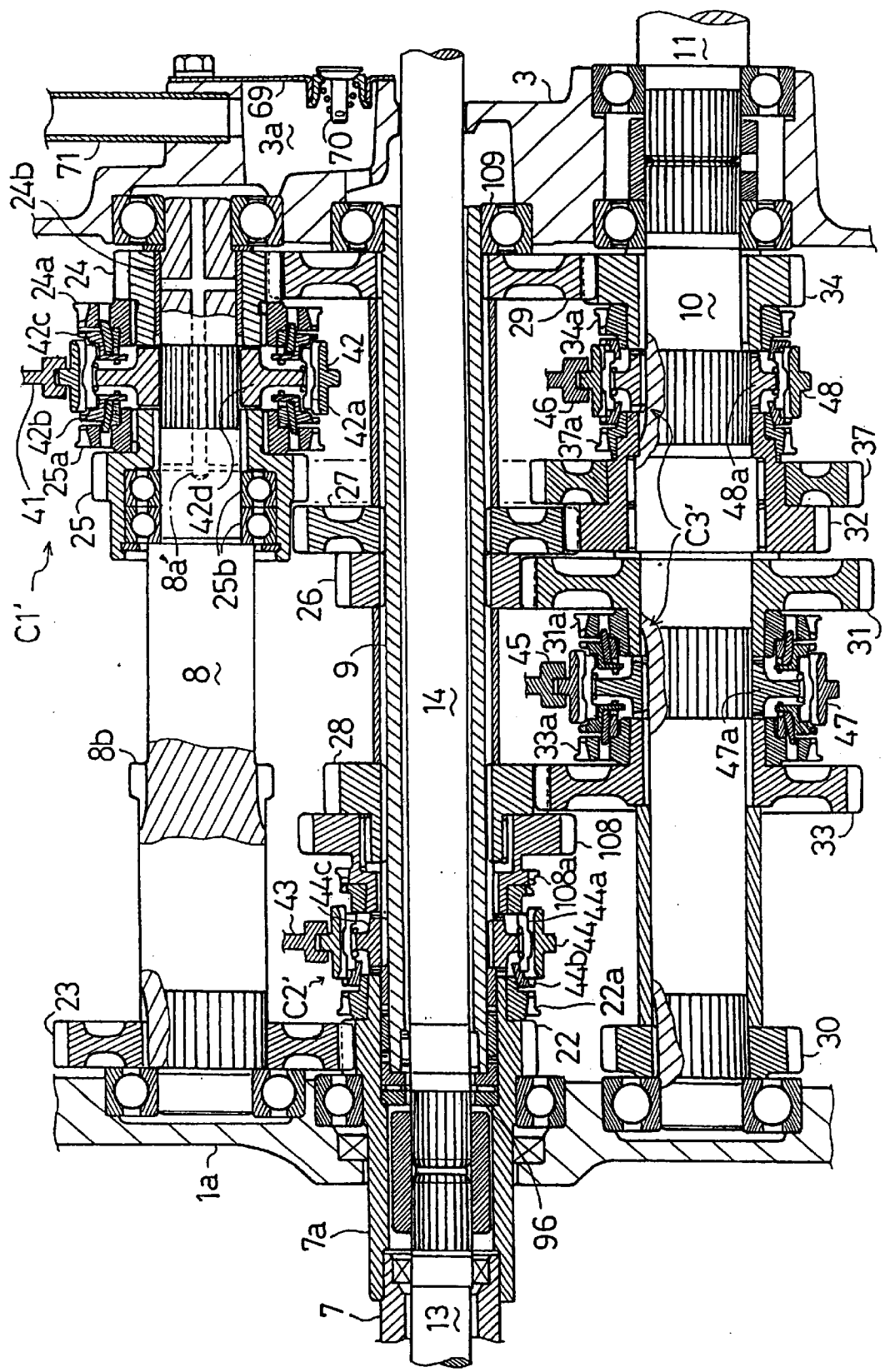
FIG. 16 is a fragmentary sectional development side view of second chamber B in transmission housing 1 showing a speed-changing system therein in accordance with the second embodiment.
Figure 17:
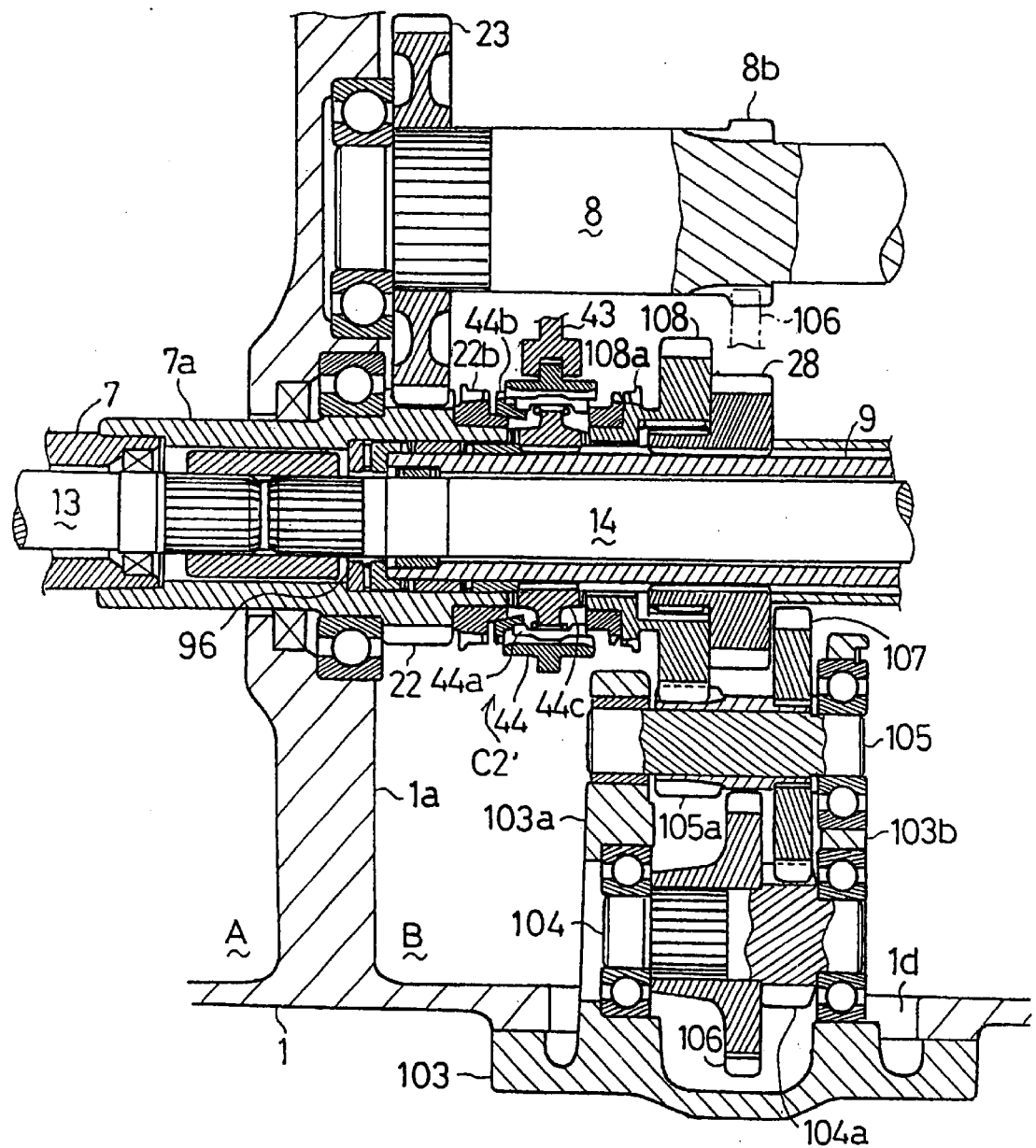
FIG. 17 is a fragmentary sectional development plan view of second chamber B in transmission housing 1 showing a creeper gear unit in accordance with the second embodiment.

Referring to FIGS. 15 to 20, there is a detailed description of the speed-changing system of the transmission of this embodiment. As shown in FIG. 17, similar to the first embodiment, shaft 8 is disposed in parallel to shafts 9 and 14 disposed behind shafts 7 and 13 on the same axis and is fixedly provided on its front end portion with gear 23 which always engages with gear 22 fixed on the rear end of shaft 7. Shaft 8 forms a creeper drive gear 8b on its portion which is a little way behind gear 23. Gears 25 and 24 are rotatably provided before and behind on the rear half portion of shaft 8. A first double acting clutch device C1' is so constructed that a synchronizer is provided between gears 25 and 24.

Explanation will be now given on first clutch device C1'. On shaft 8 is fixed a splined hub 42d between both gears 24 and 25. A clutch gear 21a provided with a synchronizer ring 42b is fitted on gear 24. A clutch gear 25a provided with a synchronizer ring 42c is fitted on gear 25. Clutch sleeve 42 provided with a key 42a is longitudinally slidably provided on hub 42d. Clutch fork 41 is anchored into sleeve 42.

While clutch sleeve 42 longitudinally slides from the neutral position shown in FIG. 16 according to the longitudinal motion of clutch fork 41, first, key 42a pushes either ring 42b or 42c so as to press it against either gear 24a or 25a, second, ring 42b or 42c is rotationally synchronized with gear 24a or 25a, whereby key 42a is released from sleeve 42 so that sleeve 42 engages with ring 42b or 42c, and finally, with gear 24a or 25a. Thus, one of gears 24 and 25 is selected to fit shaft 8 by first clutch device C1'.

Gears 24 and 25 are rotatably provided on shaft 8 through a bush 24b and bearing 25b, thereby requiring a supply of lubricating oil. Thus, as shown in FIG. 16 similar oil sump 3a is formed in plate 3 as in the first embodiment, into which oil drained from circuit 99 or another oil circuit is led through conduit 71. A lubricating oil passage 8a' bored in shaft 8 communicates with sump 3a, thereby supplying bush 24b and bearing 25b with enough lubricating oil. Bearing 25b is disposed before the recess end portion of passage 8a of the first embodiment. Thus, passage 8a' is extended deeper than passage 8a of the first embodiment and its openings are disposed on the outer surface of shaft 8 close to bearing 25b so as to supply bearing 25b interposed between shaft 8 and gear 25 with enough lubricating oil.

Similar to the first embodiment, lid 69 with relief valve 70 covers sump 3a, thereby generating pressure of lubricating oil in sump 3a. Additionally, lubricating oil from sump 3a is divided into a bearing 109 supporting the rear end of shaft 9 disposed within plate 3 and into thrust bearing 96 supporting the front end of shaft 9 through the gap between shafts 9 and 14.

As shown in FIGS. 16 and 17, on shaft 9 is disposed clutch gear 22a. which is provided with a synchronizer ring 44b and is fixed onto the rear end of boss 7a behind gear 22. Behind gear 22a is disposed second-speed gear 28 fixed onto shaft 9. A creeper driven gear 108 is rotatably provided on a boss of gear 28. A clutch gear 108a is formed on a front end of boss of gear 108. A splined hub 44c is fixed onto shaft 9 between the rear end of boss 7a and the front end of the boss of gear 108. Clutch sleeve 44 provided with a key 44c is longitudinally slidably fitted on hub 44c between clutch gears 22a and 108a. Clutch fork 43 is anchored into sleeve 44. Thus, a second clutch device C2' is provided on shaft 9, whereby selectively gear 22 is fixed to shaft 9 through the synchronizer or gear 108 is directly fixed thereto.

Second clutch device C2' appears three shift positions of clutch sleeve 44. In a neutral position, sleeve 44 engages with none of gears 22a and 108a. In a high-speed advancing position, it engages with gear 22a so as to connect shaft 9 to shaft 7 directly. And in a creeping- speed advancing position, it engages with gear 108a so as to creep shafts 8 and 9 through below discussed creeper gear train. The conditions of high speed advancing and creeping-speed can be selected by second clutch device C2' when first clutch device C1' is neutral. The conditions of reversing and low-speed advancing can be selected by first clutch device C1' when second clutch device C2' is neutral.

As shown in FIG. 16, on shaft 9 behind second-speed drive gear 28 are fixedly provided first-speed drive gear 26, third-speed drive gear 27 and fourth speed drive gear 29 from before to behind. Second-speed driven gear 33, first speed driven gear 31, third-speed driven gear 32 and fourth speed driven gear 34 rotatably provided on shaft 10 always engage with gears 28, 26, 27 and 29, respectively. Thus, four speed-reduction gear trains are disposed between shafts 9 and 10, thereby defining a speed-changing system having four speed stages.

Gear 29 engaging with gear 34 also always engage with gear 24 on shaft 8, whereby gears 24 and 29 constitute a speed-reduction gear train for low-speed advancing. When sleeve 41 of first clutch device C1' engages with gear 24a (second clutch device C2' is neutral at this time), shaft 9 is regularly rotated at reduced speed (in a rotational direction for advancing).

As shown in FIG. 16, idling gear 37 is fixedly provided on a boss of gear 32 on shaft 10 and always engages with gear 25 on shaft 8. When sleeve 41 first clutch device C1' engages with gear 25a(second clutch device C2' is neutral), rotational power of shaft 8 is transmitted to shaft 9 through a reversing gear train of gears 25, 37 and 32, whereby shaft 9 is reversely rotated (in a rotational direction for reversing).

Figure 18:
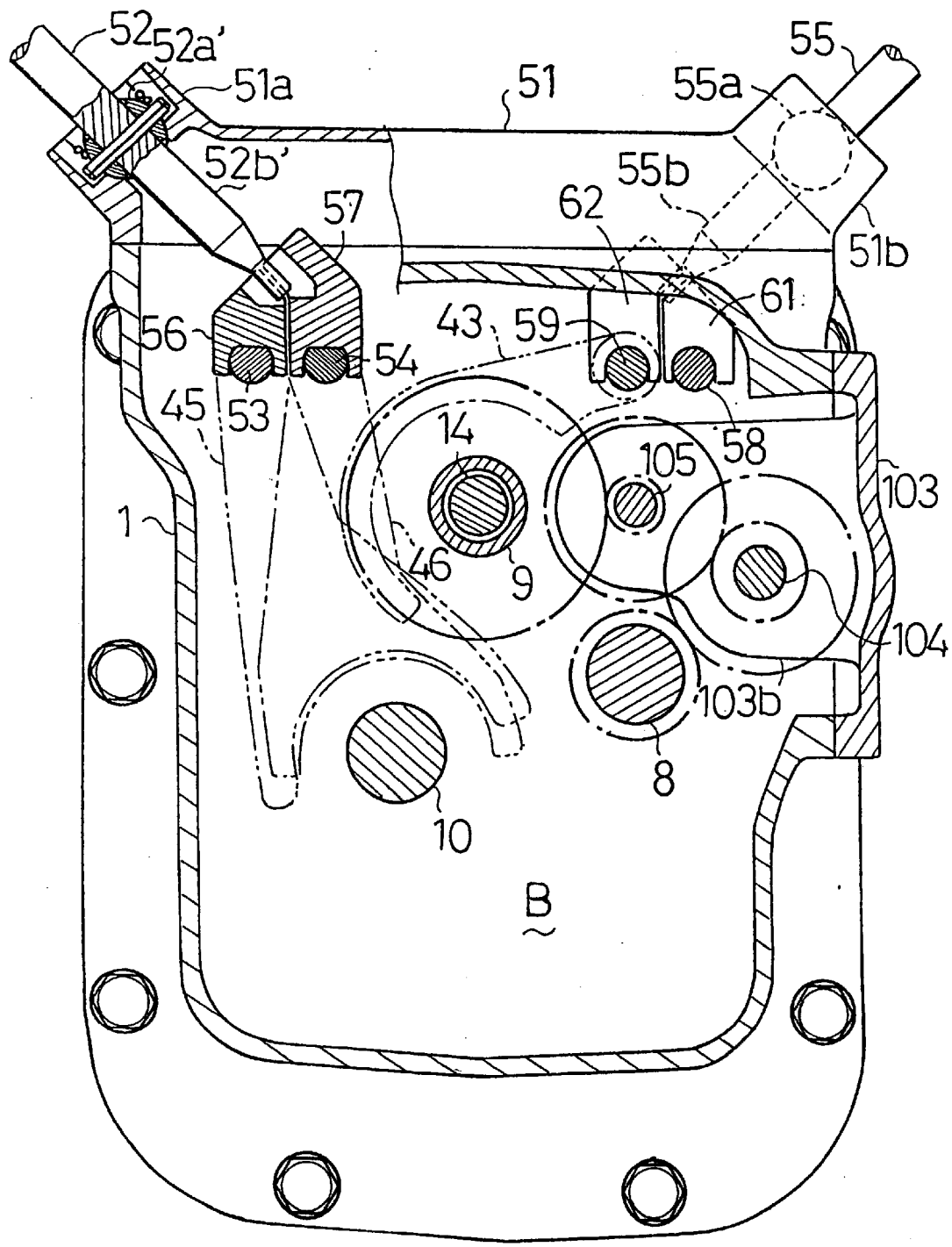
FIG. 18 is a sectional front view of second chamber B in transmission housing 1 showing clutch devices disposed therein in accordance with the second embodiment.

Explanation will be now given on the creeper gear train interposed between shafts 8 and 9 in accordance with FIGS. 17 and 18. A first creeper 106 is fixed onto first creeper shaft 104 and always engages with creeper drive gear 8b on shaft 8. A second creeper gear 104a is integrally formed by shaft 104 and always engages with a third creeper 107 fixed onto second creeper shaft 105. A fourth creeper gear 105a is integrally formed by shaft 105 and always engages with creeper driven gear 108 rotatably provided on shaft 9. When the sleeve of second clutch C2' engages with clutch gear 108a(first clutch device C1' is neutral at this time), the rotational power of shaft 8 is transmitted to shaft 9 through creeper gears 8b, 106, 104, 107, 105a and 108, whereby shaft 9 is regularly rotated at creeping speed (in a rotational direction for advancing).

On shaft 10 is provided a third clutch device C3' for selecting one of the four speed-reduction gear trains to be fixedly connected to shaft 10. Explanation will be now given on third clutch device C3' in accordance FIG. 16. Onto shaft 10 is fixed a splined hub 47d between gears and 31 and is fixed a splined hub 48d between gears 32 and 34. Front clutch sleeve 47 and rear clutch sleeve 48 are axially slidably disposed on hubs 47a and 48a respectively. Front clutch fork 45 and rear clutch fork 46 arc anchored respectively into clutch sleeves 47 and 48. Clutch gears 33a, 31a, 32a and 34a are respectively fixed onto bosses of 33, 31, 32 and 34. Sleeve 47 can selectively engage with one of gears 33a and 31a through a synchronizer and sleeve 48 can selectively engage with one of gears 32a and 34a through a synchronizer.

Such third clutch device C3' selects one of gears 33, 31, 32 and 34 to be connected to shaft 10, whereby driving power is transmitted from shaft 10 and 11 through the selected speed-reduction gear train.

The transmitting system from the speed changing-system in rear chamber B to the front-wheel driving PTO system is similar to that of the first embodiment shown in FIG. 4 and others. In this regard, gear 30 is fixed onto the front portion of shaft 10 in rear chamber B. The rotational power of shaft 10 is transmitted to shaft 20 projecting casing 4 attached to the bottom of housing 1 through the front-wheel drive gear train. The vehicle can selectively travel at either four wheel drive or two wheel drive by operation of the clutch device provided on shaft 20 in casing 4.

Next, explanation will be given on an attaching construction of main (second) speed-change lever 52 and sub (first) speed-change lever 55 as operating tools for the speed-changing system in rear chamber B and on linkages interposed between levers 52 and 55 and the speed-changing system chamber B in accordance with the second embodiment shown in FIGS. 18, 19 and 20.

Figure 19:
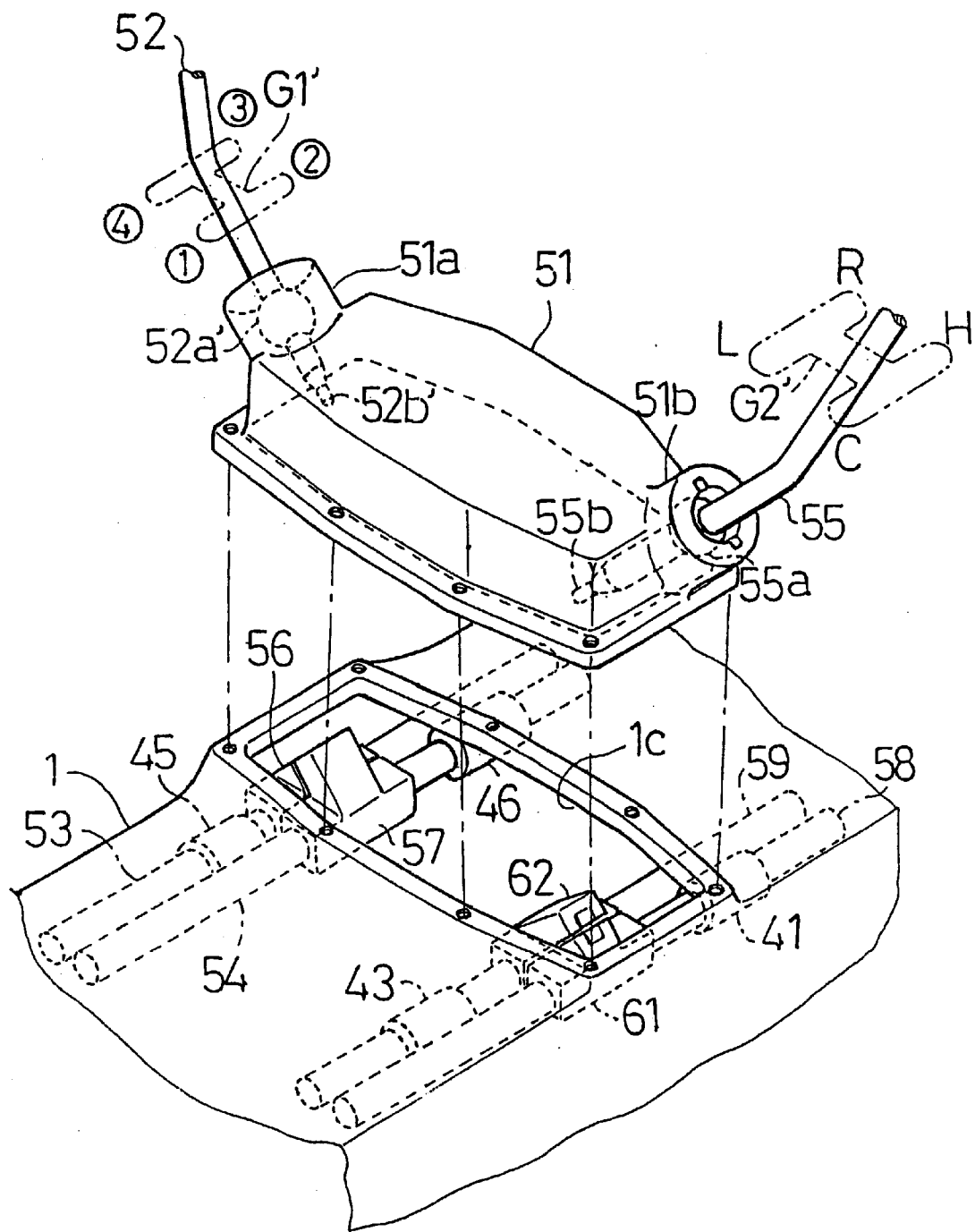
FIG. 19 is an exploded perspective view of transmission housing 1 showing that cover 51 supporting speed-changing levers is attached to housing 1 in accordance with the second embodiment.
Figure 20:
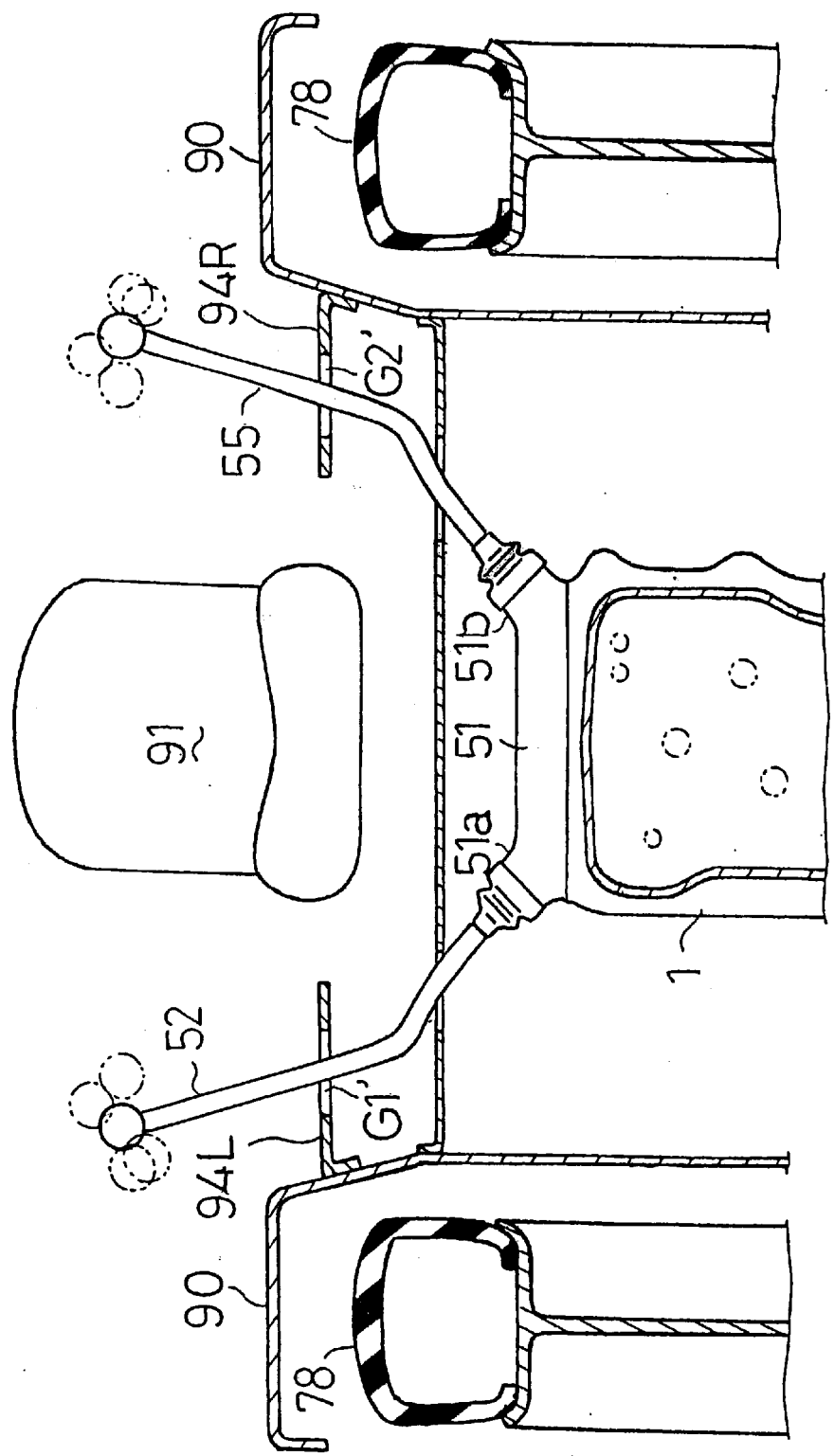
FIG. 20 is a sectional front view of the tractor showing a seat and speed-changing levers in accordance with the second embodiment.

As shown in FIG. 20, levers 52 and 55 are respectively disposed at left and right sides of operator's seat 91. Cover 51 is mounted on the top of housing 1 forming rear chamber B therein. Both basic ends of levers 52 and 55 are respectively supported in retaining portions 51a and 51b formed by cover 51 at left and right corner portions thereof As also shown in FIG. 19, cover 51 is fastened to the top wall of housing 1 by bolts so as to cover opening 1c which is open at the upper surface thereof. On maintenance of the speed changing system, the bolts are released and cover 51 is removed from housing 1, whereby levers 52 and 55 can be separated from the speed-changing system in housing 1 easily.

As shown in FIG. 19, lever 52 can be shifted among a neutral position, a first speed position I, a second-speed position II, a third-speed position III and a fourth-speed position IV along an H-like shaped guide slot GI' in guide plate 94L inside left fender 90. A ball 52a' formed by the basic end of lever 52 is rotatably supported by left retaining portion 51a, thereby making lever 52 longitudinally and laterally rotatable. In cover 51, an engaging pin 52b' projects slantingly downward.

Lever 55 can be also shifted among a neutral position, a low-speed advancing position L, a reversing position R, a creeping-speed advancing position C and a high-speed advancing position H along an H-like shaped guide slot G2' in guide plate 94R inside right fender 90. Similarly to the first embodiment, ball 55 formed by the basic end of lever 55 is rotatably supported by right retaining portion 51a, thereby making lever 55 longitudinally and laterally rotatable. In cover 51, engaging pin 55b projects slantingly downward.

As show in FIGS. 18 and 19, clutch fork shafts 58 and 59 are substantially longitudinally horizontally axially juxtaposed in a lateral row in the upper right corner space of rear chamber B just below opening 1c. A pair of clutch fork shafts 53 and 54 are substantially longitudinally horizontally axially juxtaposed in a lateral row in the upper left corner space thereof. Each of clutch shafts 58, 59, 53 and 54 is longitudinally slidably journalled between wall 1a and plate 3 and can be located among longitudinal three positions by each detent mechanism.

Similar to the first embodiment, onto shafts 58 and 59 are respectively fixed bosses of clutch forks 41 and 43 and thereon are fixed engaging members 61 and 62 for engaging with pin 55b. Onto shafts 53 and 51 are respectively fixed bosses of clutch forks 45 and 46 and thereon are fixed engaging members 56 and 57 for engaging with pin 52b'.

When cover 51 is removed by the above mentioned manner, pins 52b and 55b are naturally released respectively from members 56, 57, 61 and 62, whereby levers 52 and 55 can be separated from the speed changing system in rear chamber B. On the contrary, pins 55b and 52b' can naturally engage with members 61 and 62 and with members 56 and 57 only by settling cover 51 on housing 1, thereby enabling levers 52 and 55 to interlock the speed-changing system.

In state that cover 51 supporting levers 52 and 55 is settled on top of housing 1 and levers 52 and 55 are connected to the speed-changing system, each of clutch fork shafts 53, 54, 58 and 59 can be located by each detent mechanism among three positions disposed longitudinally.

When lever 55 is neutral so as to dispose both shafts 58 and 59 as shown in FIG. 8, both first and second clutch devices C1' and C2' are neutral as shown in FIG. 16. Then, lever 55 can engage with either member 61 or 62 through pin 55b by laterally rotational operation of lever 55 along a lateral range of slot G2'.

When lever 55 engaging with member 61 through pin 55b is longitudinally rotationally operated along a left (i.e., inside) longitudinal range of slot G2', shaft 58 slides longitudinally, thereby switching first, clutch device C1'. When such lever 55 reaches position L at the front end of the range of slot G2', first clutch device C1' connects gear 24 with shaft 8 for regularly rotating shaft 10 at a low speed. When lever 55 reaches position R at the rear end thereof, first clutch device C1' connects gear 25 with shaft 8 for reversely rotating shaft 10.

When lever 55 engaging with member 62 through pin 55b is longitudinally, rotationally operated along a right (i.e., outside) longitudinal range of slot G2', shaft 59 slides longitudinally, thereby switching second clutch device C2'. When such lever 55 reaches position C at the front end of the range of slot G2', second clutch device C2' connects gear 108, with shaft 9 for regularly rotating shaft 10 at a creeping speed. When lever 55 reaches position H at the rear end thereof, second clutch device C2' connects shaft 9 with shaft 7 directly for regularly rotating shaft 10 at a high speed.

When lever is neutral so as to position shafts 53 and 54 as shown in FIG. 19 sleeves 47 and 48 of third clutch device C3' are neutral as shown in FIG. 4. Then, lever 52 can engage with either member 56 or 57 through pin 52b' by laterally rotational operation of lever 52 along a lateral range of slot G1'.

When lever 52 engaging with member 56 through pin 52b' is longitudinally rotationally operated along a right (i.e., inside) longitudinal range of slot G1', shaft 54 slides longitudinally, thereby shifting sleeve 48 of third clutch device C3'. When such lever 52 reaches the third speed position III at the front end of the range of slot G1', sleeve 48 connects gear 32 with shaft 10 for rotating shaft 10 at a third speed. When lever 52 reaches the second speed position IV at the rear end thereof, sleeve 48 connects gear 34 with shaft 10 for rotating it at a fourth speed.

When lever 52 engaging with member 57 through pin 52b' is longitudinally rotationally operated along a left (i.e., outside) longitudinal range of slot G1', shaft 53 slides longitudinally, thereby shifting sleeve 47 of third clutch device C3. When such lever 52 reaches the first speed position I at the front end of the range of slot G1', sleeve 47 connects gear 31 with shaft 10 at a first speed. When lever 55 reaches the second speed position II at the rear end thereof, sleeve 47 connects gear 33 with shaft 10 for rotating it at a second speed.

When lever 52 engaging with member 62 through pin 55b is longitudinally rotationally operated along a right (i.e., outside) longitudinal range of slot 62', shaft 59 slides longitudinally, thereby switching second clutch device C2'. When such lever 55 reaches position C at the front end of the range of slot G2', second clutch device C2'connects gear 108 with shaft 9 for regularly rotating shaft 10 at a creeping speed. When lever 55 reaches position H at the rear end thereof, second clutch device C2' connects shaft 9 with shaft 7 directly for regularly rotating shaft 10 at a high speed.

What is claimed is:

1. A transmission for a working vehicle constructed between a traveling-input shaft driven by an engine and a traveling-output shaft for driving wheels, comprising:
    a first speed-changing shaft always rotationally following the traveling-input shaft and disposed in parallel to said traveling-input shaft and to the traveling-output shaft;
    a second speed-changing shaft disposed in parallel to said first speed-changing shaft and to said traveling-output shaft and disposed so as to face said traveling-input shaft on the same axis thereof;
    a reversing arrangement interposed between said first and second speed-changing shafts, and
    a multi-speed-changing arrangement interposed between said second speed-changing shaft and said traveling-output shaft, wherein power is transmitted from said reversing arrangement to said multi-speed-changing arrangement.

2. A transmission for a working vehicle as set forth in claim 1, wherein said traveling-input shaft and said second speed-changing shaft are cylindrical and a PTO transmission shaft is disposed so as to pass through said traveling-input shaft and said second speed-changing shaft.

3. A transmission for a working vehicle as set forth in claim 1, further comprising:
    a housing containing said traveling-input shaft, said first speed-changing shaft, said second speed-changing shaft and said traveling-output shaft, wherein said traveling-input shaft and said second speed-changing shaft are disposed at substantially lateral center of said housing, said first speed-changing is disposed in one lateral side space thereof and said traveling-output shaft is disposed in the other lateral side space thereof.

4. A transmission for a working vehicle as set forth in claim 3, wherein said traveling-output shaft is provided thereon with a front-wheel driving PTO gear drivingly connected to front wheels and is disposed lower than said first speed-changing shaft.

5. A transmission for a working vehicle constructed between a traveling-input shaft driven by an engine and a traveling-output shaft for driving wheel, comprising:
    a first speed-changing shaft always rotationally following the traveling-input shaft and disposed in parallel to said traveling-input shaft;
    a second speed-changing shaft disposed in parallel to said first speed-changing shaft and disposed so as to face said traveling-input shaft on the same axis thereof;
    a regularly rotational speed-reduction gear train and a reversely rotational speed-reduction gear train interposed between said first and second speed-changing shafts;
    a plurality of speed-reduction gear trains interposed between said second speed changing shaft and the traveling-output shaft;
    a first clutch device operable to selectively connect said first and second speed changing shafts through one of said regularly and reversely rotational speed-reduction gear trains;
    a second clutch device operable to selectively connect said second speed-changing shaft and said traveling-input shaft, and
    a third clutch device operable to selectively connect said second speed-changing shaft and said traveling-output shaft through one of said speed reduction gear trains, wherein said first and second clutch devices are interlocked with each other so that said first clutch device disengages said first speed-changing shaft from said second speed-changing shaft when said second clutch device engages said second speed-chawing shaft with said traveling-input shaft.

6. A transmission for a working vehicle as set forth in claim 5, wherein said traveling-input shaft and said second speed-changing shaft are cylindrical and a PTO transmission shaft is disposed so as to pass through said traveling-input shaft and said second speed-changing shaft.

7. A transmission for a working vehicle as set forth in claim 5, further comprising:
    a housing containing said traveling-input shaft, said first speed-changing shaft, said second speed-changing shaft and said traveling-output shaft, wherein said traveling-input shaft and said second speed-changing shaft are disposed at substantially lateral center of said housing, said first speed-changing is disposed in one lateral side space thereof and said traveling-output shaft is disposed in the other lateral side space thereof.

8. A transmission for a working vehicle as set forth in claim 7, wherein said traveling-output shaft is provided thereon with a front-wheel driving PTO gear drivingly connected to front wheels and is disposed lower than said first speed-changing shaft.

9. A transmission for a working vehicle as set forth in claim 5, wherein at least one of said first, second and third clutch devices has a synchronizer.

10. A transmission for a working vehicle as set forth in claim 5, further comprising:
    a speed-changing lever which is longitudinally and laterally movable, wherein said first and second clutch devices are selectively operably connected to said speed-changing lever.

11. A transmission for a working vehicle as set forth in claim 5, further comprising:
    a speed-changing lever which is longitudinally movable along a straight shift pattern, wherein said third clutch device is shifted by operation of said speed-changing lever so as to selectively rotate said traveling-output shaft at one of multi-speed stages.

12. A transmission for a working vehicle as set forth in claim 5, further comprising:
    a housing containing all of said shafts and said clutch devices;
    a first speed-changing lever which is operable to selectively shift said first and second clutch devices;
    a second speed-changing lever which is operable to shift said third clutch device, and
    a cover mounted on said housing, wherein said first and second levers are supported by said cover.

13. A transmission for a working vehicle constructed between a traveling-input shaft driven by an engine and a traveling-output shaft for driving wheels, comprising:
    a first speed-changing shaft always rotationally following the traveling-input shaft and disposed in parallel to said traveling-input shaft;

a second speed-changing shaft disposed in parallel to said first speed-changing shaft and disposed so as to face said traveling-input shaft on the same axis thereof;

a first drive gear relatively rotatably provided on said first speed-changing shaft for rotating said second speed-changing shaft in a regular direction;

a second drive gear relatively rotatably provided on said first speed-changing shaft for rotating said second speed-changing shaft in a reverse direction;

an idling gear relatively rotatably provided on the traveling-output shaft, wherein said idling gear always engages with said second drive gear;

a first clutch device provided on said first speed-changing shaft, wherein said first clutch device is operable to selectively connect one of said first and second gears to said first speed-changing shaft;

a second clutch device interposed between said traveling-input shaft and said second speed-changing shaft, wherein said second clutch device is operable to connect said traveling-input shaft and said second speed-changing shaft when said first and second drive gear are disconnected to said first speed-changing shaft;

a plurality of drive gears fixedly provided on said second speed-changing shaft;

a plurality of driven gears relatively rotatably provided on said traveling-output shaft, wherein each of said driven gears always engages with each of said drive gears on said second speed-changing shaft, and a third clutch device provided on said traveling-output shaft, wherein said third clutch device is operable to selectively connect one of said driven gears to said traveling-output shaft.

14. A transmission for a working vehicle as set forth in claim 13, wherein said first drive gear always engages with one of said drive gears on said second speed-changing shaft and said idling gear always engages with another of said drive gears on the same.

15. A transmission for a working vehicle as set forth in claim 13, including said driven gears consisting of a first-speed driven gear, a third-speed driven gear, a second-speed driven gear and a fourth-speed driven gear relatively rotatably disposed on said traveling-output shaft in this order from one to the other end of said traveling-output shaft, wherein said third clutch device comprises:

a first clutch sleeve not relatively rotatably and axially slidably provided on said traveling-output shaft between said first and third driven gears;

clutch members provided respectively on said first and third driven gears, being selectively engagable with said first clutch sleeve;

a second clutch sleeve not relatively rotatably and axially slidably provided on said traveling-output shaft between said second-and-fourth-speed driven gears, and clutch members provided respectively on said second-and-fourth-speed driven gears, being selectively engagable with said second clutch sleeve, said first and second clutch sleeves are connected to said second lever, so as to slide simultaneously and to the same direction according to the longitudinal motion of said second lever, and while said first and second clutch sleeves slide on said traveling-21 output shaft from one to the other end thereof, said traveling-output shaft is firstly connected to said first-speed driven gear through said first clutch sleeve, secondly connected to said second-speed driven gear through said second clutch sleeve, thirdly connected to said third-speed driven gear through said first clutch sleeve and finally connected to said fourth-speed driven gear through said second clutch sleeve.

16. A transmission for a working vehicle constructed between a traveling-input shaft driven by an engine and a traveling-output shaft for driving wheels, comprising:

a first speed-changing shaft always rotationally following the traveling-input shaft and disposed in parallel to said traveling-input shaft;

a second speed-changing shaft disposed in parallel to said first speed-changing shaft so as to face said traveling-input shaft on the same axis thereof;

a regular speed-reduction gear train, a reversing speed-reduction gear ! rain and a creeping speed-reduction gear train interposed between said first and second speed-changing shafts;

a plurality of speed-reduction gear trains interposed between said second speed-changing shaft and the traveling-output shaft;

a first clutch device operable to selectively connect said first and second speed-changing shafts through one of said regular and reversing speed- reduction gear trains;

a second clutch device selectively enabling said traveling-input shaft to be connected with said second speed-changing shaft directly and to be connected with said creeping speed-reduction gear train when said first clutch disconnects said first and second speed-changing shafts, and a third clutch device operable to selectively connect said second speed-changing shaft and said traveling-output shaft through one of said plurality of speed-reduction gear trains.

17. A transmission for a working vehicle as set forth in claim 16, further comprising:

a speed-changing lever which is operable to turn to both opposite directions on a line from its neutral position, wherein one of said first and second clutch devices can be selectively shifted by operation of only said single lever.

18. A transmission for a working vehicle as set forth in claim 16, wherein said first clutch device is provided on said first speed-changing shaft, said second clutch device is provided on said second speed-changing shaft, and said third clutch device is provided on said traveling-output shaft.

19. A transmission for a working vehicle as set forth in claim 16, including said creeping speed-reduction gear train further comprising:

a creeper drive gear fixedly provided on said first speed-changing shaft;

a creeper driven gear relatively rotatably provided on said second speed-changing shaft;

transmission gears connecting said creeper drive and driven gears, and a lid detachably attached to a housing, wherein said transmission gears are supported by said lid.

\* \* \* \* \*

UNITED STATES PATENT AND TRADEMARK OFFICE
CERTIFICATE OF CORRECTION

PATENT NO.   : 6,314,827 B1
DATED        : November 13, 2001
INVENTOR(S)  : Matsufuji It is certified that error appears in the above-identified patent and that said Letters Patent is hereby corrected as shown below:

Column 2,
Line 66, delete "though" and insert -- through -- therefor.

Column 3,
Line 29, delete "one with".

Column 4,
Line 6, delete "below discussed" and insert -- below-discussed -- therefor.
Move Column 4, lines 9-11 to after Column 4, line 15.
Line 58, after "driven gears are" add -- relatively rotatably provided --.
Line 59, delete "relatively rotatably provided".

Column 9,
Line 66, after "thereof" add -- . --.

Column 10,
Line 62, delete "th e" and insert -- the -- therefor.

Column 11,
Line 4, delete "be a ring" and insert -- bearing -- therefor.

Column 18,
Line 23, delete "engage" and insert -- engages -- therefor.

Column 19,
Line 37, delete "speed position I ," and insert -- speed position I, -- therefor.
Line 39, delete "GI'" and insert -- G1' -- therefor.

Column 20,
Line 26, delete "switching first, clutch device" and insert -- switching first clutch device -- therefor.

Column 22,
Line 15, delete "speed-chawing" and insert -- speed-changing -- therefor.

Column 23,
Line 62, delete "traveling-21 output" and insert -- traveling-output -- therefor.

UNITED STATES PATENT AND TRADEMARK OFFICE
CERTIFICATE OF CORRECTION

PATENT NO.   : 6,314,827 B1
DATED        : November 13, 2001
INVENTOR(S)  : Matsufuji It is certified that error appears in the above-identified patent and that said Letters Patent is hereby corrected as shown below:

<u>Column 24,</u>
Line 19, delete "! rain" and insert -- train -- therefor.

Signed and Sealed this

Ninth Day of July, 2002

Attest:

Attesting Officer

JAMES E. ROGAN
*Director of the United States Patent and Trademark Office*